(12) United States Patent
Peters, Jr.

(10) Patent No.: US 11,697,933 B2
(45) Date of Patent: Jul. 11, 2023

(54) CONNECTOR PIPE SCREEN WITH EXPANDABLE RING MOUNTING ASSEMBLY

(71) Applicant: Fabco Industries Inc., Farmingdale, NY (US)

(72) Inventor: John Peters, Jr., Coram, NY (US)

(73) Assignee: Fabco Industries Inc., Farmingdale, NY (US)

( * ) Notice: Subject to any disclaimer, the term of this patent is extended or adjusted under 35 U.S.C. 154(b) by 0 days.

(21) Appl. No.: 17/590,060

(22) Filed: Feb. 1, 2022

(65) Prior Publication Data
US 2022/0243448 A1   Aug. 4, 2022

Related U.S. Application Data

(60) Provisional application No. 63/145,088, filed on Feb. 3, 2021.

(51) Int. Cl.
| | | |
|---|---|---|
| *E03F 5/04* | (2006.01) | |
| *E03F 5/06* | (2006.01) | |
| *E03F 5/14* | (2006.01) | |
| *B01D 35/30* | (2006.01) | |

(52) U.S. Cl.
CPC .............. *E03F 5/06* (2013.01); *B01D 35/306* (2013.01); *E03F 5/041* (2013.01); *E03F 5/0404* (2013.01); *E03F 5/14* (2013.01); *E03F 2005/065* (2013.01)

(58) Field of Classification Search
CPC .......... E02B 5/0404; E02B 5/041; E02B 5/06; E02B 5/14; E02B 7/06; E02B 2005/065; B01D 35/306

USPC .......... 210/162, 170.03, 460, 461, 462, 463, 210/747.3; 248/94
See application file for complete search history.

(56) References Cited

U.S. PATENT DOCUMENTS

| | | | | |
|---|---|---|---|---|
| 6,165,357 A | * | 12/2000 | Cormier .............. | E04D 13/0409 210/463 |
| 6,254,770 B1 | * | 7/2001 | Remon ................. | E03F 5/0404 210/163 |
| 6,330,724 B1 | * | 12/2001 | Belle ......................... | E03F 5/06 4/286 |
| 6,334,953 B1 | * | 1/2002 | Singleton ................. | E03F 5/14 210/460 |
| 6,358,405 B1 | * | 3/2002 | Leahy ..................... | E03F 5/14 210/170.03 |
| 6,749,746 B2 | * | 6/2004 | Mokrzycki ........... | E03F 5/0404 210/170.03 |
| 7,276,156 B2 | * | 10/2007 | Lockerman ........... | E03F 5/0404 210/170.03 |
| 10,683,655 B2 | | 6/2020 | Peters, Jr. et al. | |

(Continued)

*Primary Examiner* — Christopher Upton
(74) *Attorney, Agent, or Firm* — Bodner & O'Rourke, LLP; Gerald T. Bodner; Christian P. Bodner

(57) ABSTRACT

A connector pipe screen device configured for mounting on a water conduit includes an expandable ring mounting assembly, the expandable ring mounting assembly being configured to be engagable with and securable to the conduit near or at an axial end of the conduit at which a conduit opening is disposed, a back plate mounted on the expandable ring mounting assembly and a front cover mounted on the back plate. The front cover has a perforated portion defining a multiplicity of openings formed therein to allow water to pass through the perforated portion and to prevent debris carried by the water from passing through the perforated portion.

27 Claims, 20 Drawing Sheets

(56) References Cited

U.S. PATENT DOCUMENTS

| | | | |
|---|---|---|---|
| 2004/0188357 A1* | 9/2004 | Moore | E03F 5/14 210/747.3 |
| 2013/0008851 A1* | 1/2013 | Jarvis, Jr. | E03F 5/0404 210/499 |
| 2014/0064840 A1* | 3/2014 | McInnis | E03F 5/0404 403/374.3 |
| 2018/0304177 A1* | 10/2018 | Kent | E03F 5/14 |

* cited by examiner

CONNECTOR PIPE SCREEN WITH EXPANDABLE RING MOUNTING ASSEMBLY

CROSS-REFERENCE TO RELATED APPLICATIONS

This application is related to U.S. Provisional Patent Application Ser. No. 63/145,088, filed on Feb. 3, 2021, and titled "Connector Pipe Screen With Expandable Ring Mounting Assembly", the disclosure of which is hereby incorporated by reference and on which priority is hereby claimed.

BACKGROUND OF THE INVENTION

Field of the Invention

The present invention generally relates to storm water drainage and waste water filtration systems, and more particularly relates to containment apparatus and systems incorporated into such storm water drainage systems.

Description of the Prior Art

Storm water drainage systems are commonly used in streets, highways, parking lots and other paved surfaces throughout the United States and in foreign countries, especially in urban developments, to remove water accumulating on the surfaces thereof. Most people would recognize the presence of such drainage systems from the heavy metal grates mounted flush in parking lots, streets or sidewalks. Under the grate is usually found a concrete, fiberglass or metal catch basin, which is connected to a drain pipe or infiltration conduit that channels the storm water away from the area to a relatively large water collection reservoir, or to a river, stream or other body of water.

With respect to street-located drainage systems, elongated curbside openings lead to buried catch basins and direct storm water from the street thereinto. Unfortunately, the storm water draining into the catch basin carries with it debris often in the form of man-made disposable items, such as plastic and glass soda and water bottles, paper products, cups, plates, discarded umbrellas and the like, just to name a few. These items find their way into the catch basin and collect there, filling the catch basin and diminishing the ability of the catch basin to receive and hold runoff water until the water can drain therefrom through the infiltration conduits. This debris may also clog the infiltration conduits and prevent water from draining from the catch basin to which the conduits are connected. Worse still, such debris carried by the storm water may pass through the infiltration conduits and pollute the water collection reservoir, river, stream or other body of water into which water from the conduits drains.

Such catch basins and infiltration conduits need to be periodically cleaned to remove the debris collecting therein. This task is usually assigned to and carried out by the municipality's Department of Public Works, and requires a labor-intensive effort and special equipment to vacuum out or rake up the debris residing at the bottom of the catch basin or floating on the storm water therein. It may even necessitate the Public Works employee to enter the catch basin to remove debris therefrom by hand or debris that is clogging the infiltration conduits and preventing the catch basin from draining.

To prevent such debris from entering the infiltration conduit from such catch basins, a connector pipe screen device is often used. Connector pipe screen units are typically screening devices that are installed inside a catch basin, and directly in front of the infiltration conduit, or outlet pipe, preventing trash and debris from entering the pipe. The purpose of such connector pipe screen devices is to use the entire catch basin structure as a trash or debris trap.

There are several connector pipe screen designs currently on the market; however, many such designs are difficult to install in a catch basin. The problem resides in attaching the connector pipe screen unit to the catch basin inside walls. Often times, these walls are cracked, have ledges, holes, imperfections or other irregularities, making it difficult to attach the connector pipe screen unit therein. Also, there are times when the outlet pipe that the connector pipe screen unit is meant to protect is located in or near a corner of the catch basin. This makes attaching the screen very difficult, and often requires a specially designed unit to allow for mounting the unit within the catch basin.

OBJECTS AND SUMMARY OF THE INVENTION

It is an object of the present invention to provide a connector pipe screen device which is mountable directly on an infiltration conduit or outlet pipe in a storm water catch basin.

It is another object of the present invention to provide a connector pipe screen device which is mountable on an existing infiltration conduit or outlet pipe and which may be easily removed therefrom for cleaning.

It is a further object of the present invention to provide a connector pipe screen device which may be mounted on an infiltration conduit or outlet pipe in a storm water catch basin and which allows storm water collecting in the catch basin to flow into the conduit or pipe and therethrough but prevents relatively large debris from entering the conduit or pipe.

In one form of the present invention, a connector pipe screen device includes an expandable ring mounting assembly that may be placed inside the outlet pipe and expanded within the inner diameter of the pipe and secured therein. The connector pipe screen device further includes a back plate which may be secured to the expandable ring assembly, and a removable front cover preferably in a form of water permeable screen having a multiplicity of holes formed through the thickness thereof which is mounted to the back plate of the connector pipe screen device. The perforated front cover may be removed from the unit for periodic cleaning, as necessary.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 1:
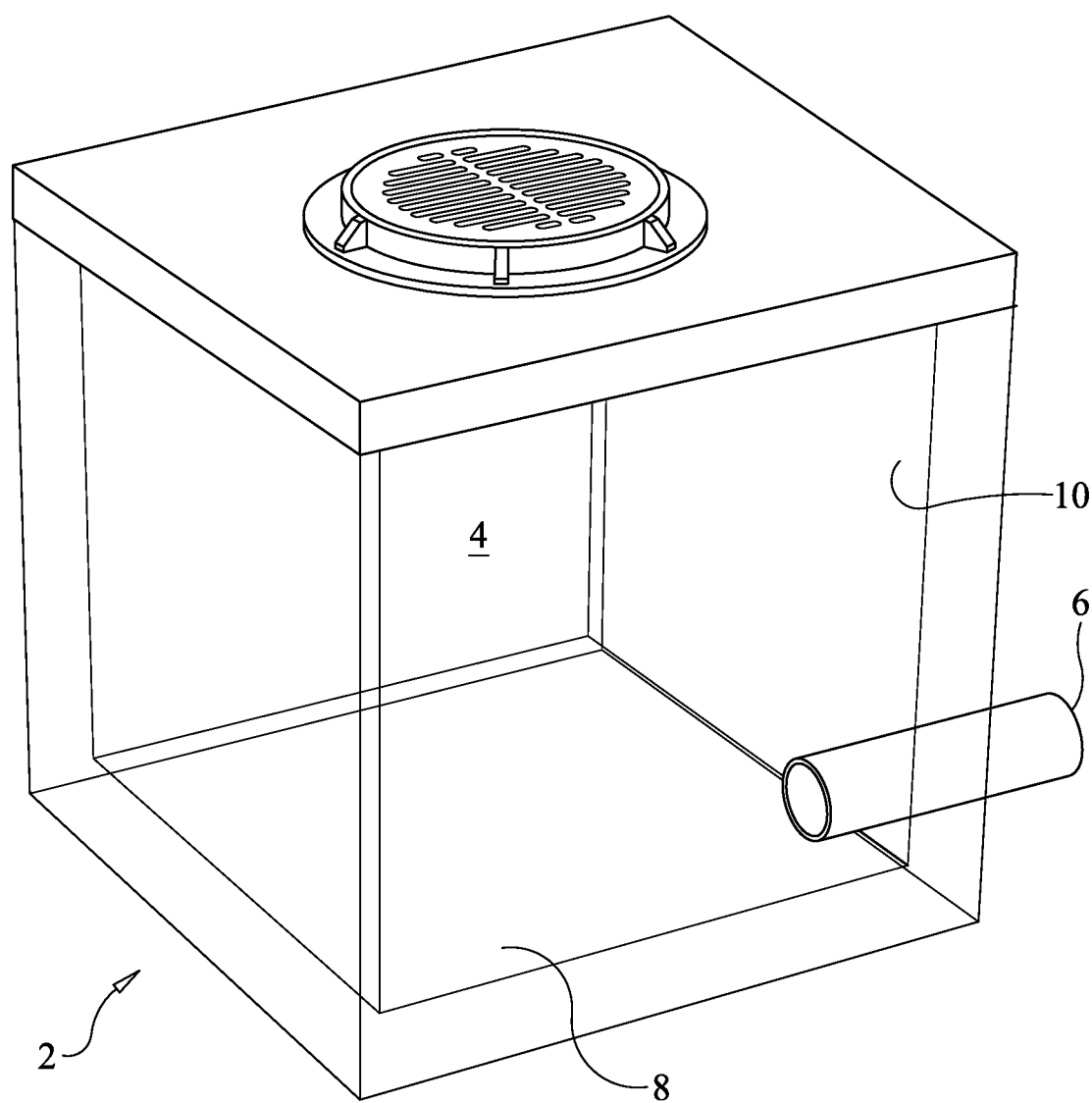
FIG. 1 is a perspective view of a typical catch basin, the catch basin being shown in transparent form to illustrate the position of an infiltration conduit or outlet pipe therein.
Figure 2:
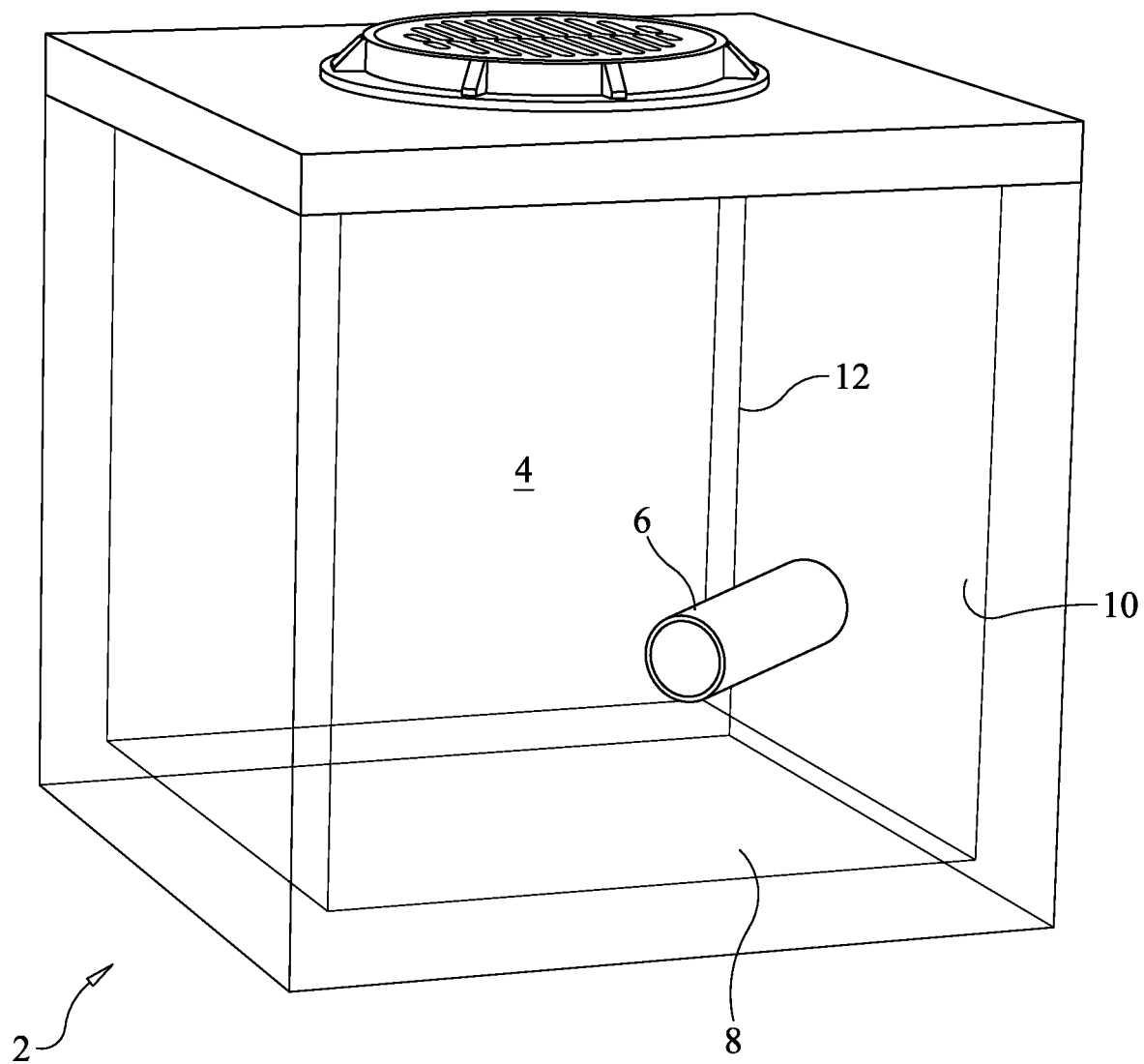
FIG. 2 is another perspective view of a typical catch basin, the catch basin being shown in transparent form to illustrate the position of an angled infiltration conduit or outlet pipe therein.

Typical catch basins 2, located either curbside or non-curbside, are illustrated by FIGS. 1 and 2 of the drawings. Such catch basins 2 are commonly formed from precast concrete, rectangularly shaped in transverse cross-section, and defining an interior cavity 4 in which storm water, and debris carried by the storm water, accumulate. An outlet pipe 6 extends above the floor 8 of the catch basin 2 and into the interior cavity 4 thereof either substantially perpendicularly to one of the side walls 10 of the catch basin 2, such as shown in FIG. 1 of the drawings, or at an angle near the corner 12 of the catch basin 2, where two side walls 10 meet, such as shown in FIG. 2 of the drawings. One of the problems with mounting any type of debris screening device in the catch basin 2 is that the side walls 10 have irregularities in their formation, or adjacent side walls 10 are not precisely perpendicular to each other, making it difficult to mount a debris screening device within the catch basin 2 on one or more of the side walls 10 thereof.

However, regardless of the poor condition of the catch basin side walls 10, or the location of the pipe 6 inside the catch basin 2, it has been found that the one surface that is typically in good condition, and accurate with regard to dimensions, is the inner diameter of the outlet pipe 6 itself. Accordingly, this new design of a connector pipe screen device 14 formed in accordance with the present invention takes advantage of the known and consistent dimensions of the inner diameter of the outlet pipe 6, and also the fact that the outlet pipe 6, raised above the floor 8 of the catch basin 2 and extending a partial distance into the interior cavity 4 thereof away from the side walls 10, provides an excellent location for mounting the connector pipe screen device 14 of the present invention within the catch basin 2 to prevent debris from entering the outlet pipe 6.

Figure 3:
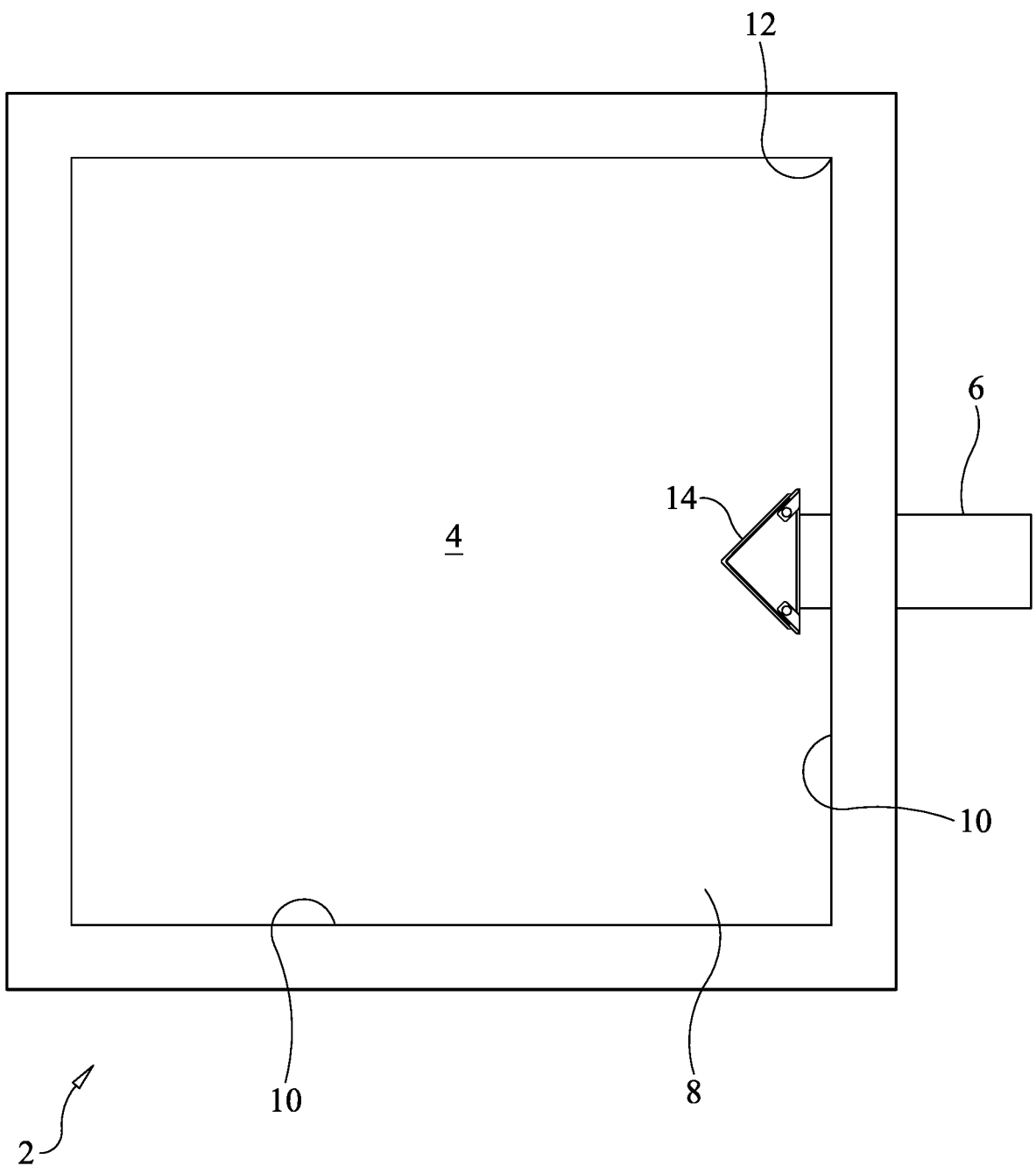
FIG. 3 is a top plan view of a catch basin, such as shown in FIGS. 1 and 2, with the top slab of the catch basin removed to facilitate the viewing of the inside of the catch basin, and showing a side wall mounted outlet pipe therein, and the connector pipe screen device of the present invention mounted on the outlet pipe.
Figure 4:
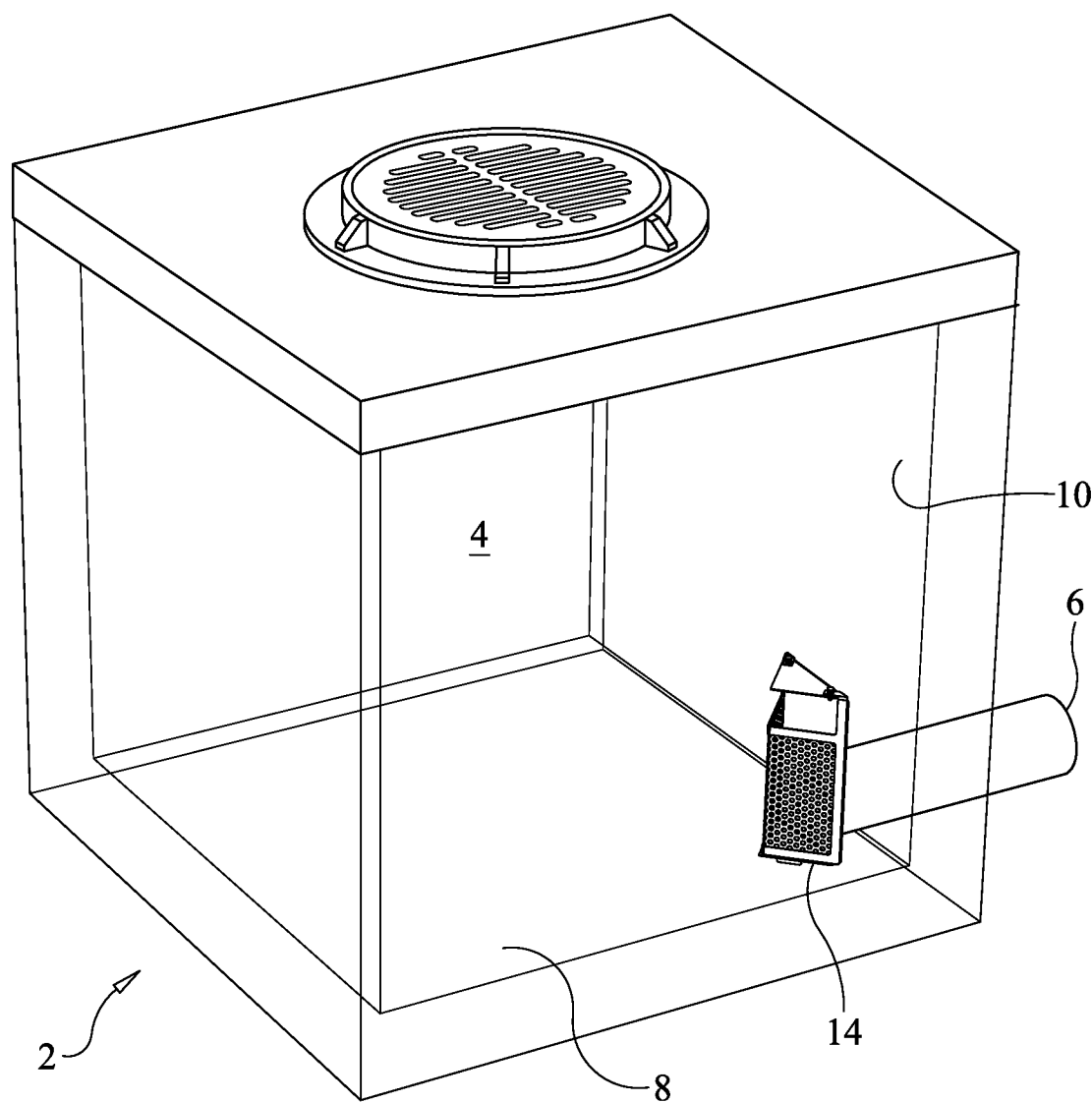
FIG. 4 is a perspective view of a catch basin, the catch basin being shown in transparent form to illustrate the position of a side wall mounted outlet pipe therein, and illustrating the connector pipe screen device of the present invention mounted on the outlet pipe.
Figure 5:
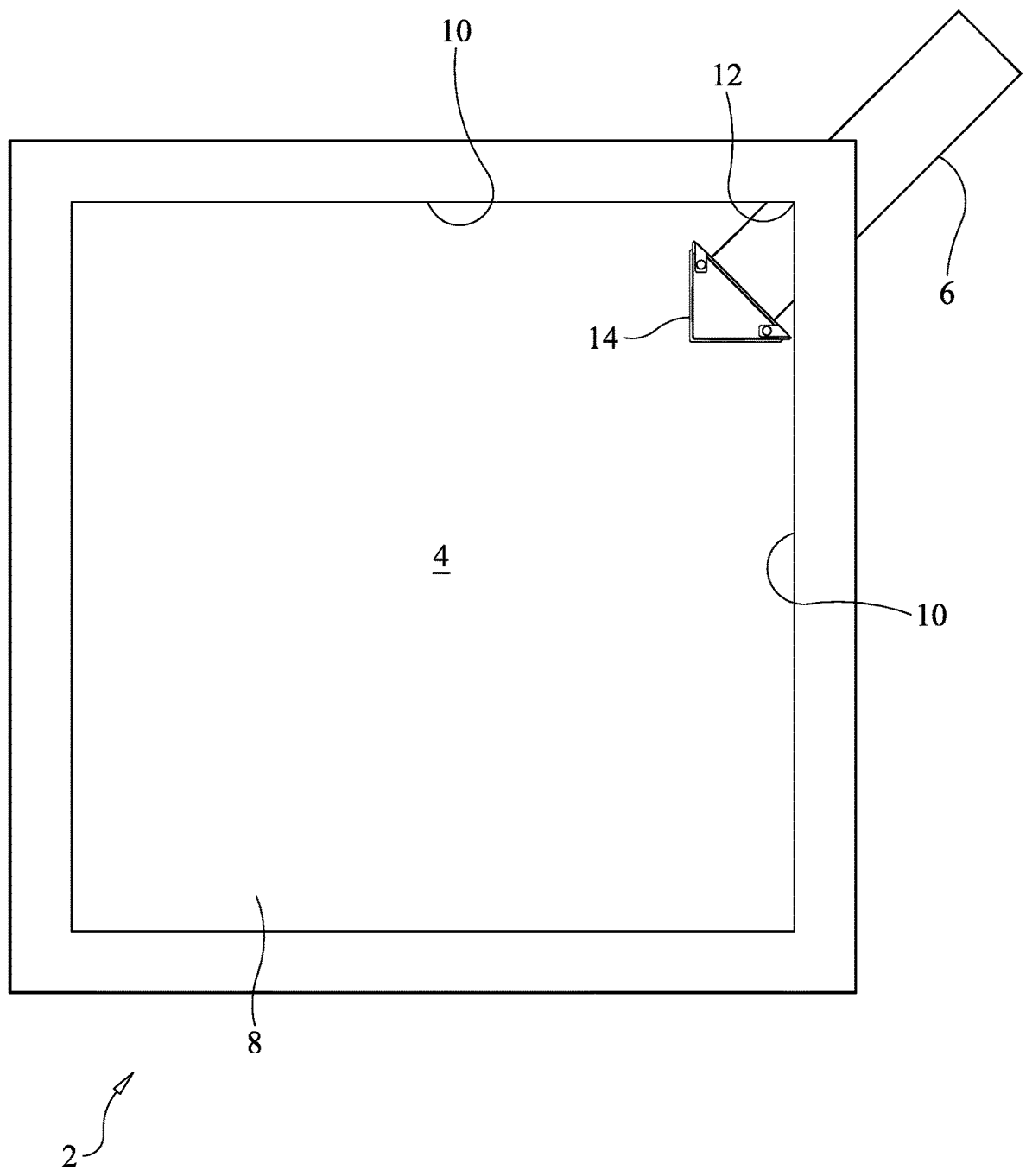
FIG. 5 is a top plan view of a catch basin, such as shown in FIGS. 1 and 2, with the top slab of the catch basin removed to facilitate the viewing of the inside of the catch basin, and showing a corner mounted outlet pipe therein, and the connector pipe screen device of the present invention mounted on the outlet pipe.
Figure 6:
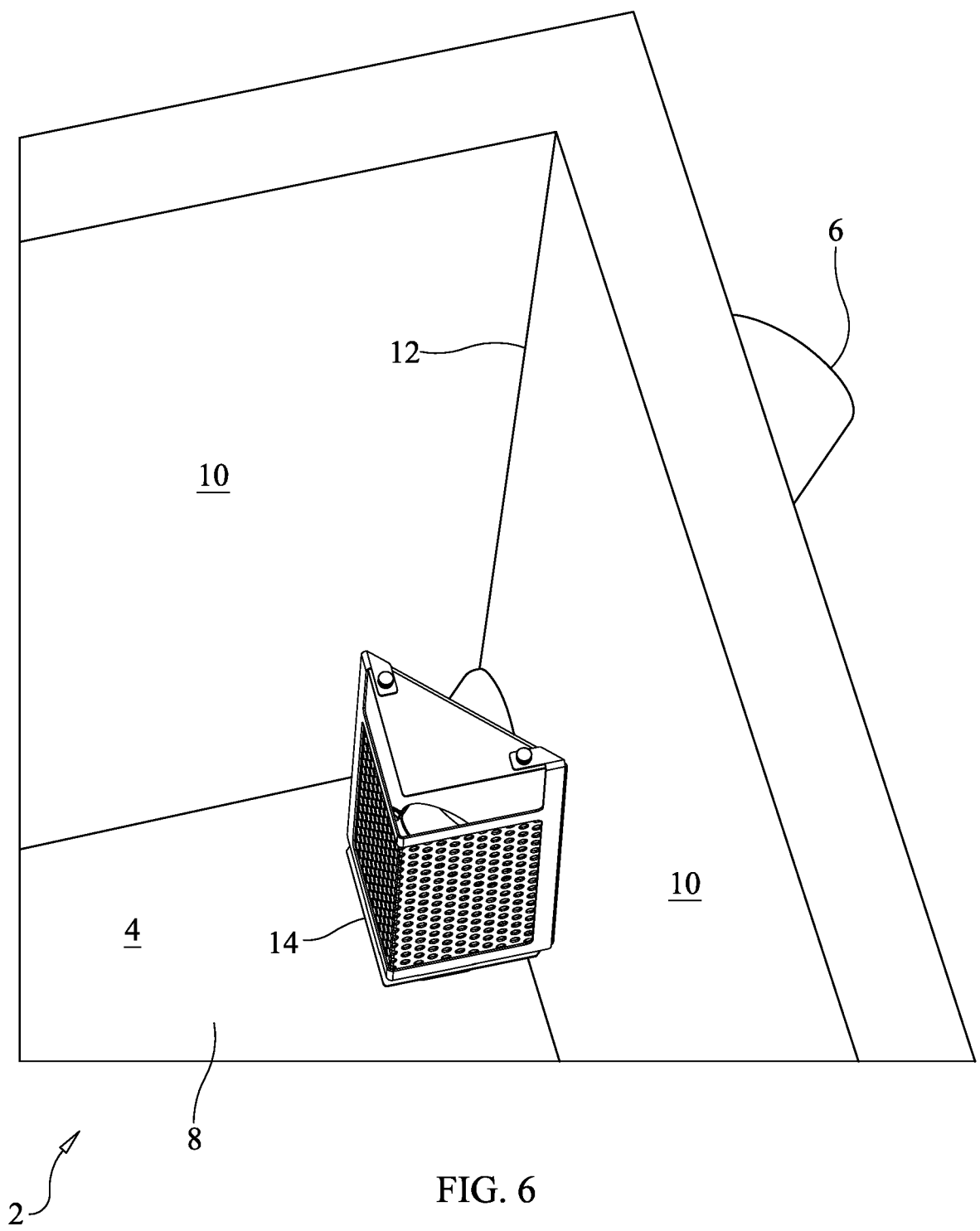
FIG. 6 is a perspective view of a portion of the catch basin shown in FIG. 5, and illustrating the connector pipe screen device of the present invention attached to the corner mounted outlet pipe.
Figure 7:
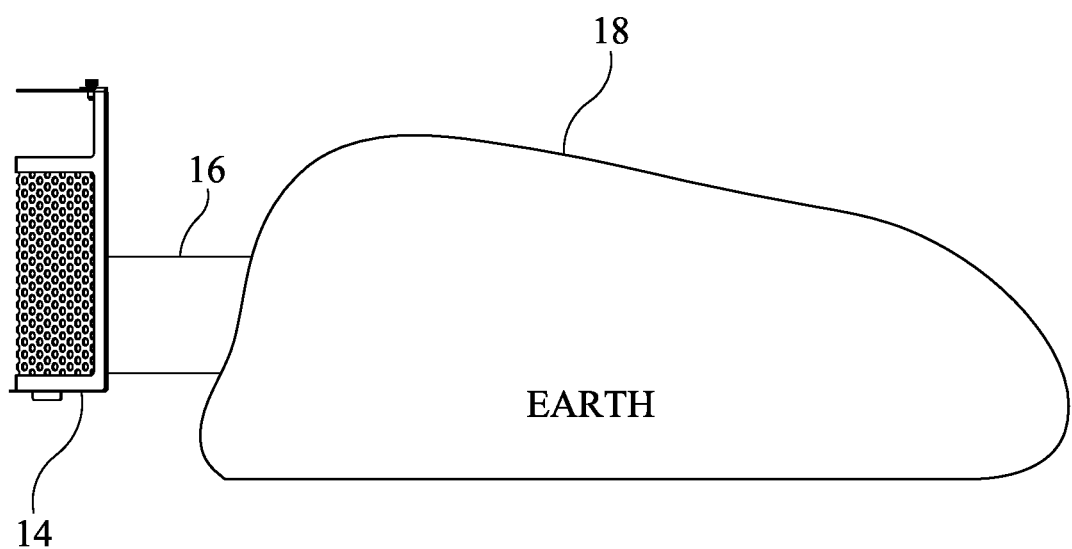
FIG. 7 is a side elevational view of the connector pipe screen device of the present invention shown mounted on an outlet pipe or infiltration conduit that is not situated in a catch basin but rather extends into or to a dune, berm or leach field, illustrating the applicability of the connector pipe screen device of the present invention for use on outlet pipes, or inlet pipes, to prevent debris from flowing therein or therethrough.

FIGS. 3 and 4 illustrate the connector pipe screen device 14 of the present invention being mounted on an outlet pipe 6 extending substantially perpendicularly into the interior cavity 4 through a side wall 10 of the catch basin 2. FIGS. 5 and 6 illustrate the connector pipe screen device 14 of the present invention being mounted on an angled outlet pipe 6 extending into the interior cavity 4 near or at a corner 12 of the catch basin 2. However, it should be realized that the connector pipe screen device 14 of the present invention may be mounted on any conduit 16, such as an outlet pipe or an inlet pipe, unassociated with a catch basin 2, such as entering a dune or berm 18, or leading to a leach field, such as shown in FIG. 7 of the drawings, or to a drain pipe that channels the storm water away from an area to a relatively large water collection reservoir, or to a river, stream or other body of water.

Figure 8:
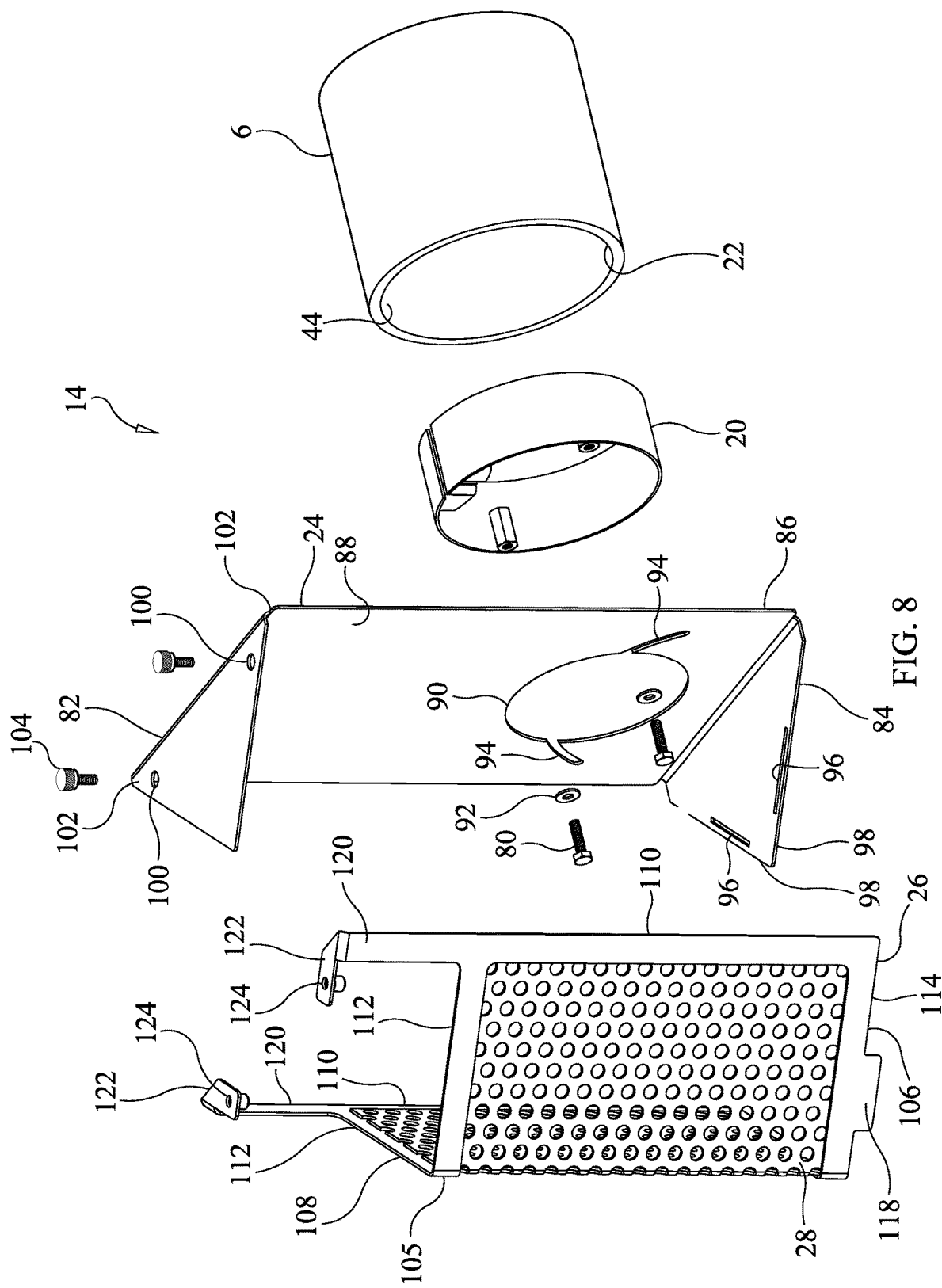
FIG. 8 is an exploded, perspective view of the connector pipe screen device of the present invention, along with a portion of an outlet pipe or infiltration conduit on which the connector pipe screen device of the present invention is mounted.
Figure 9:
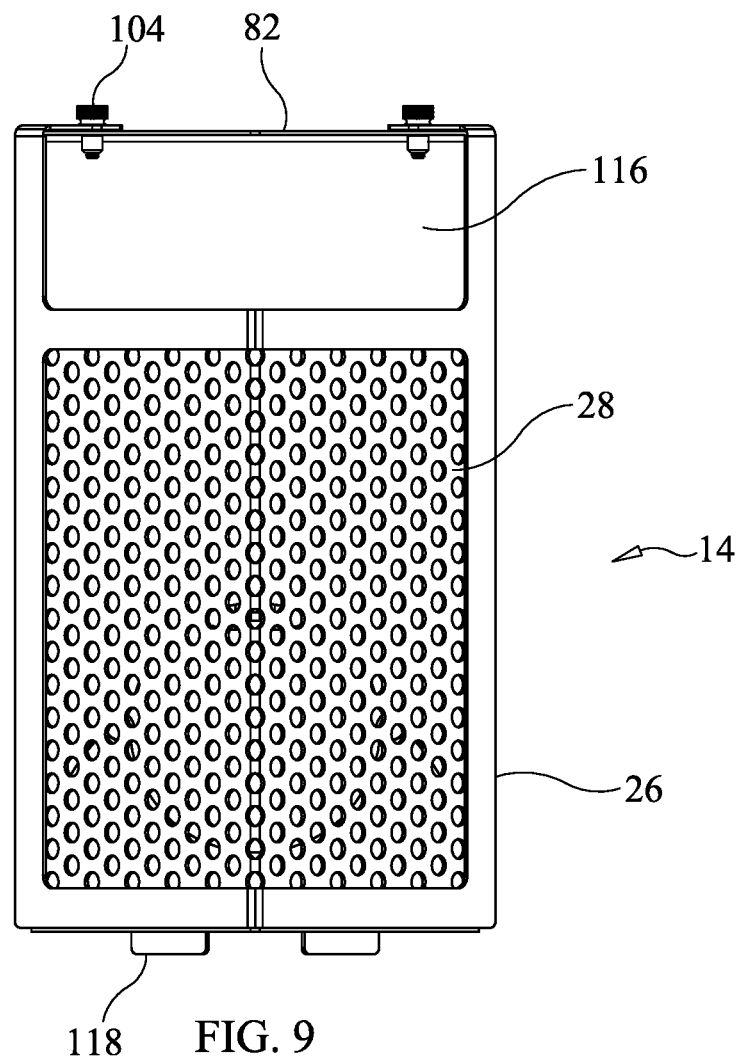
FIG. 9 is a front view of the connector pipe screen device of the present invention.
Figure 10:
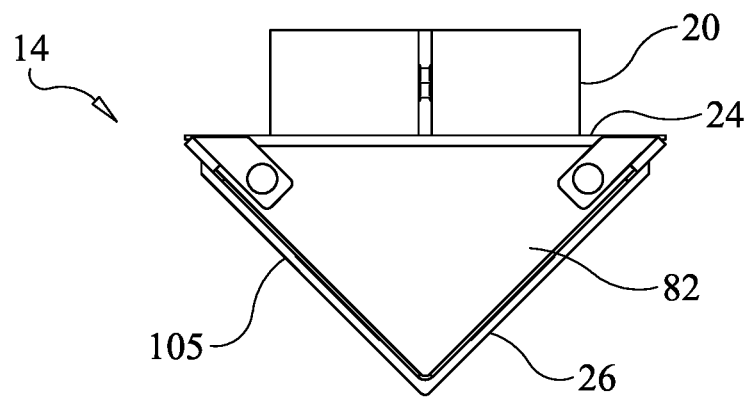
FIG. 10 is a top plan view of the connector pipe screen device of the present invention.
Figure 11:
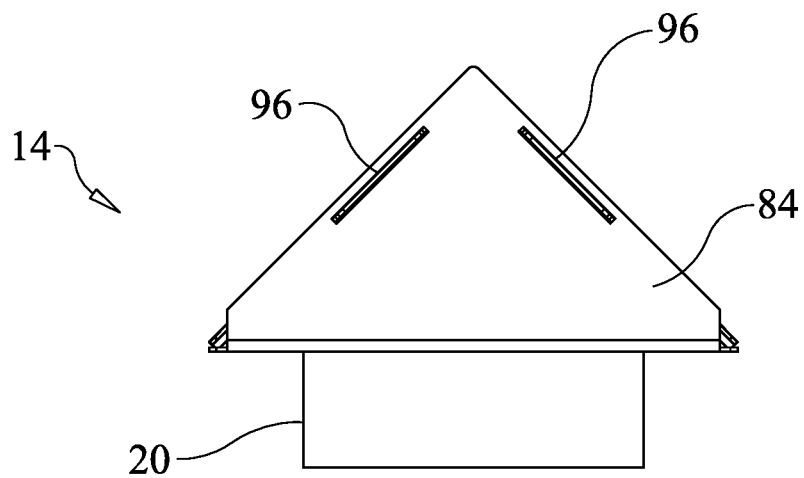
FIG. 11 is a bottom plan view of the connector pipe screen device of the present invention.
Figure 12:
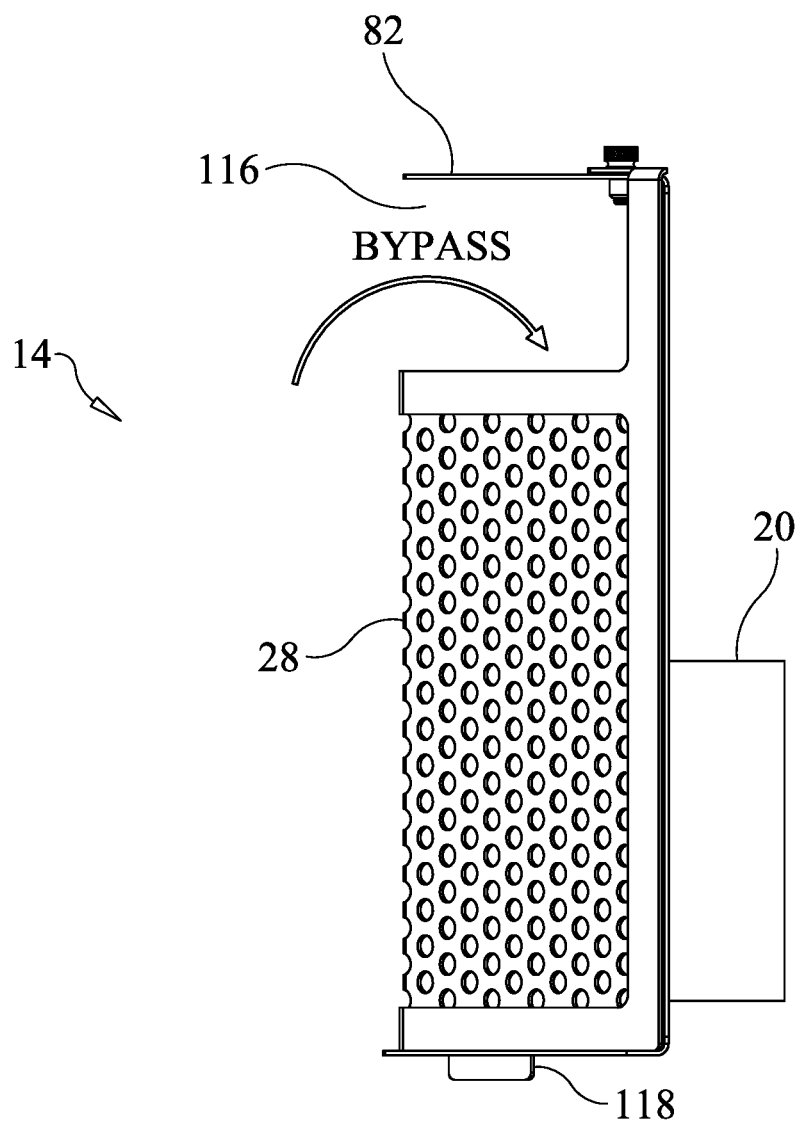
FIG. 12 is a side elevational view of the connector pipe screen device of the present invention.
Figure 13:
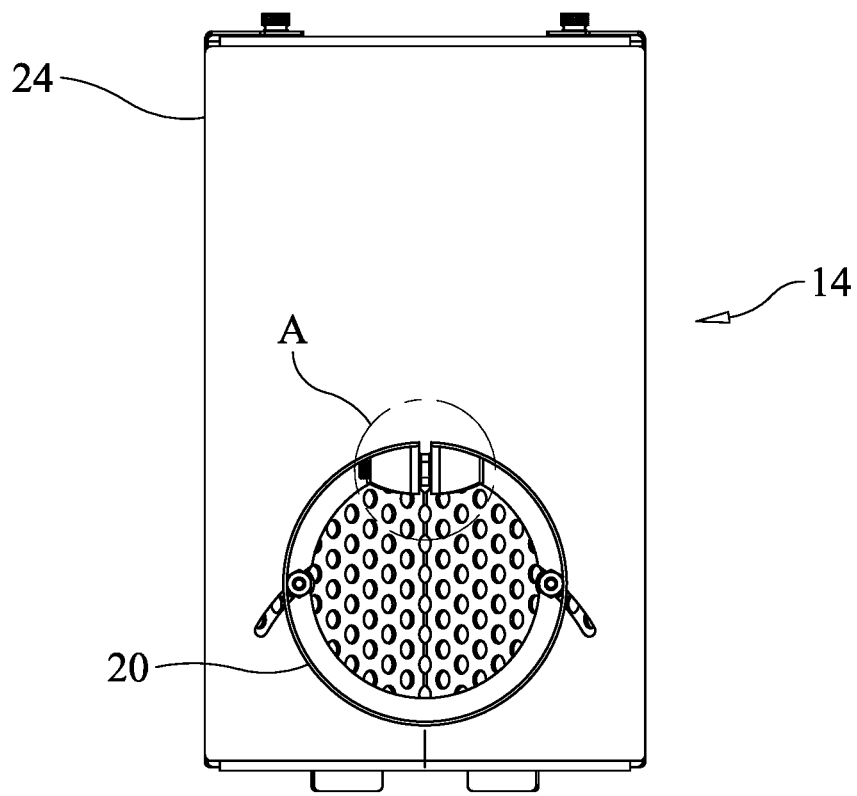
FIG. 13 is a rear view of the connector pipe screen device of the present invention.
Figure 14:
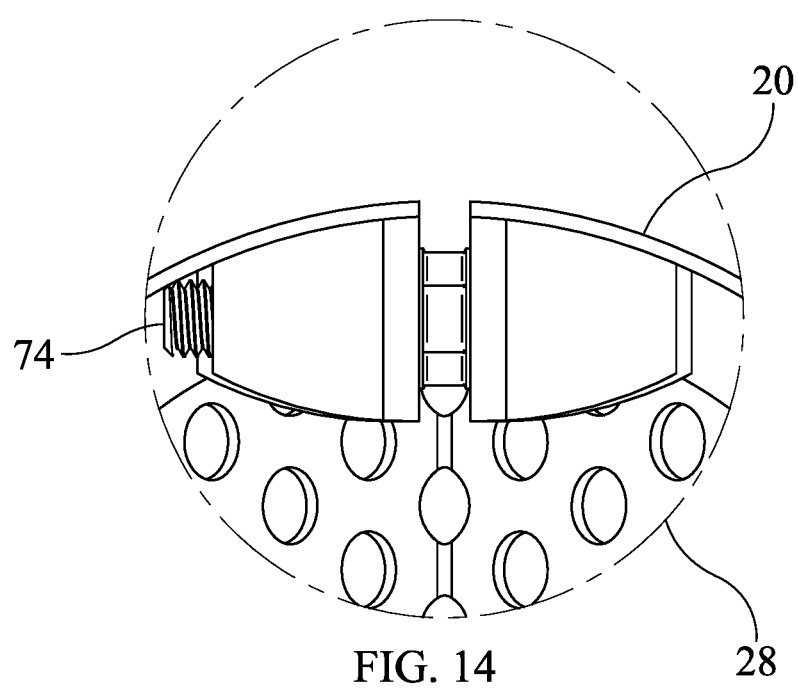
FIG. 14 is an enlarged front view of a portion of the expandable ring mounting assembly of the connector pipe screen device of the present invention which is shown in the partially dashed circle labeled as "A" of FIG. 13.
Figure 15:
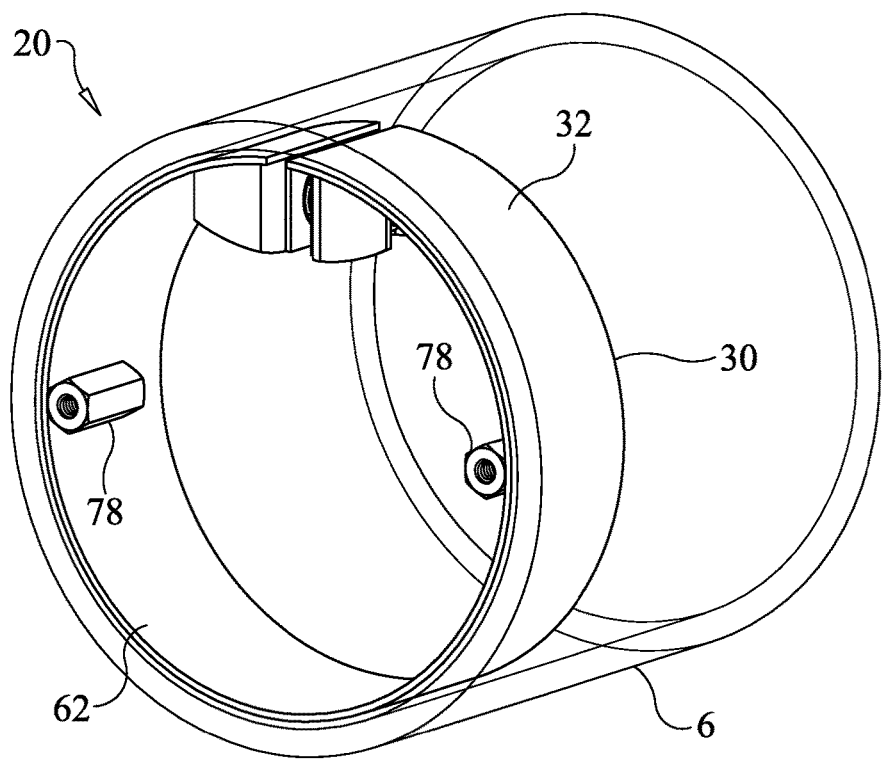
FIG. 15 is a perspective view of the expandable ring mounting assembly of the connector pipe screen device of the present invention shown mounted on an outlet pipe, the outlet pipe being shown in transparent form to illustrate the positioning of the expandable ring mounting assembly of the connector pipe screen device thereon.
Figure 16:
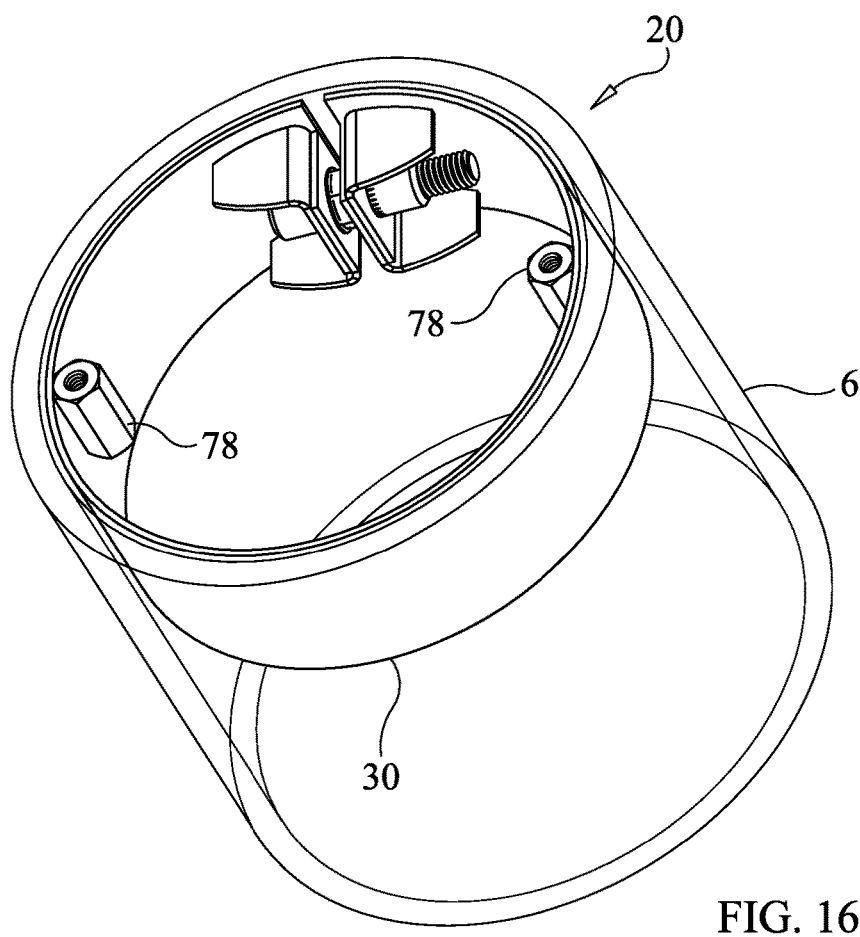
FIG. 16 is a perspective view, taken from a different angle than that of FIG. 15, of the expandable ring mounting assembly of the connector pipe screen device of the present invention shown mounted on an outlet pipe, the outlet pipe being shown in transparent form to illustrate the positioning of the expandable ring mounting assembly of the connector pipe screen device thereon.
Figure 17A:
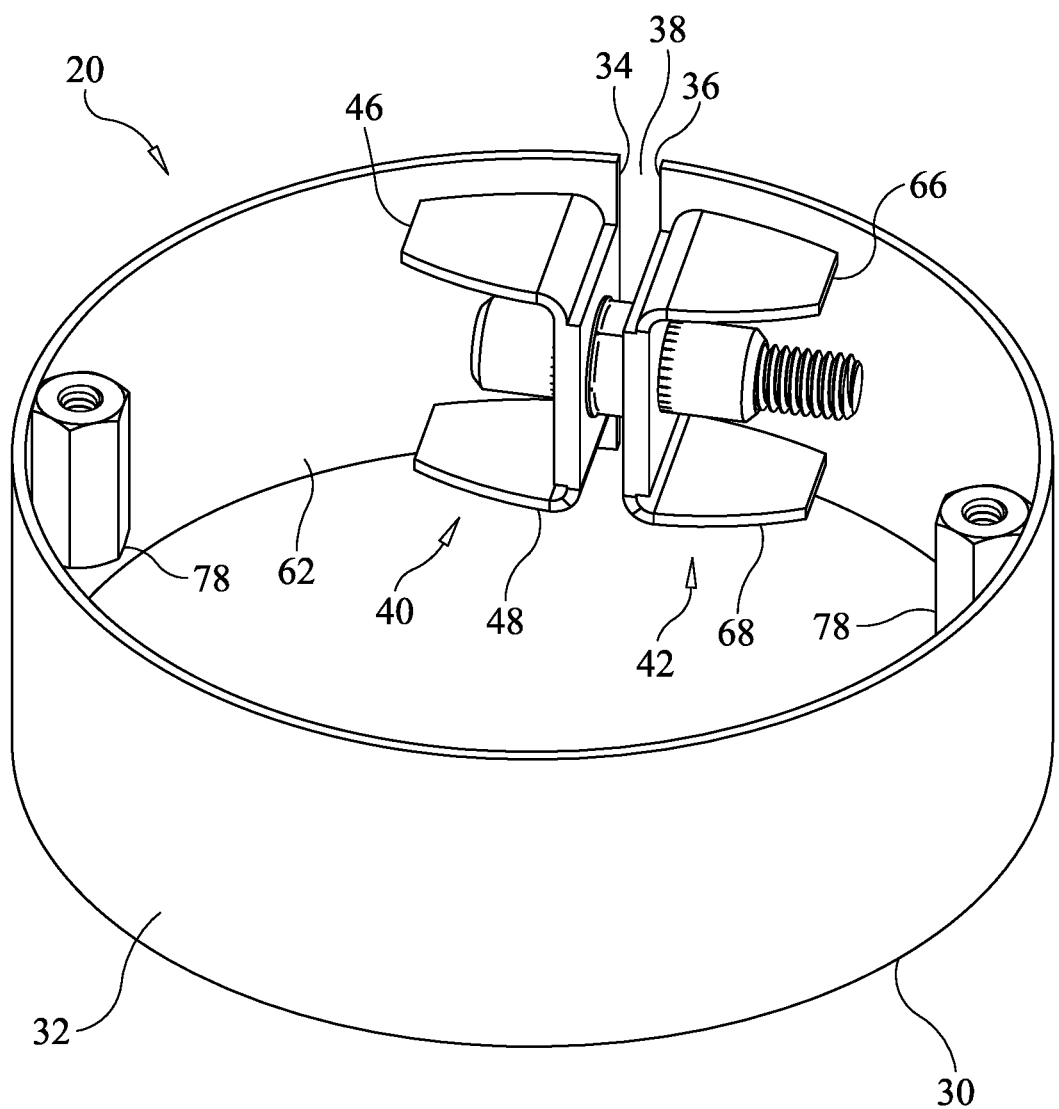
FIG. 17A is a perspective view of the expandable ring mounting assembly of the connector pipe screen device of the present invention.
Figure 17B:
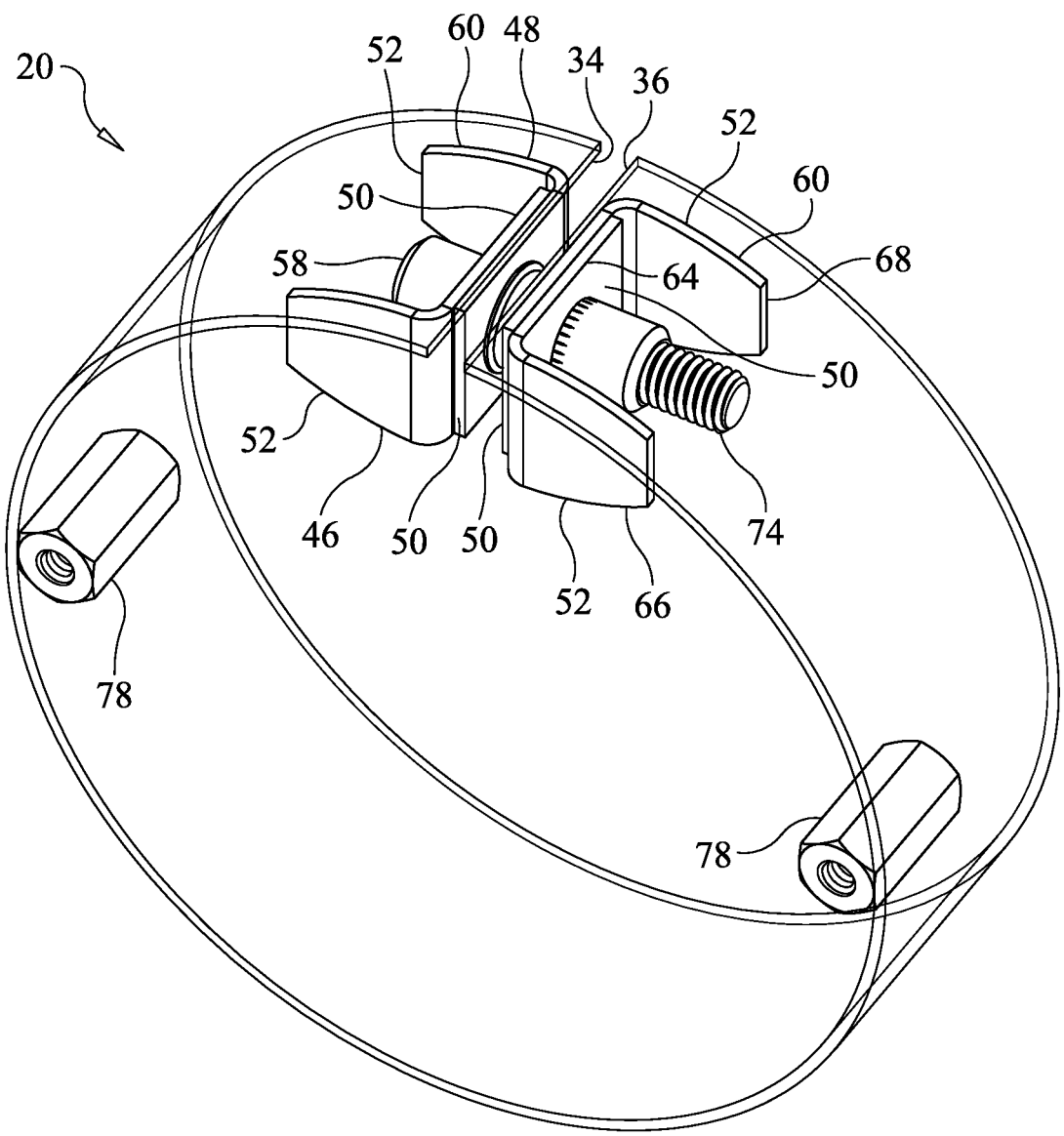
FIG. 17B is a perspective view of the expandable ring mounting assembly of the connector pipe screen device of the present invention, with the expandable ring thereof shown in transparent form to facilitate the viewing of other components of the assembly.
Figure 17C:
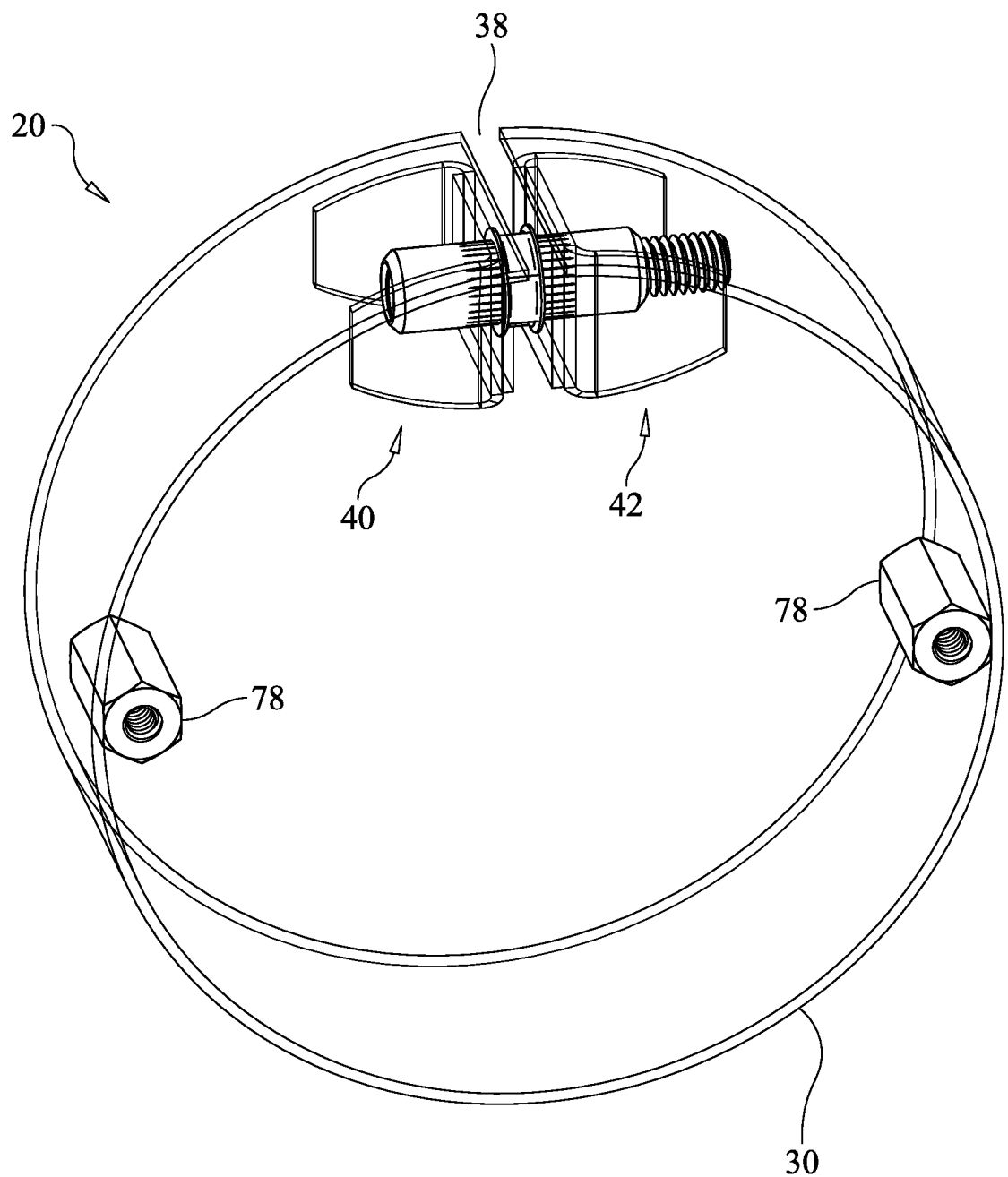
FIG. 17C is another perspective view of the expandable ring mounting assembly of the connector pipe screen device of the present invention, with the expandable ring thereof and certain other components of the assembly shown in transparent form to facilitate the viewing of other components of the assembly.
Figure 17D:
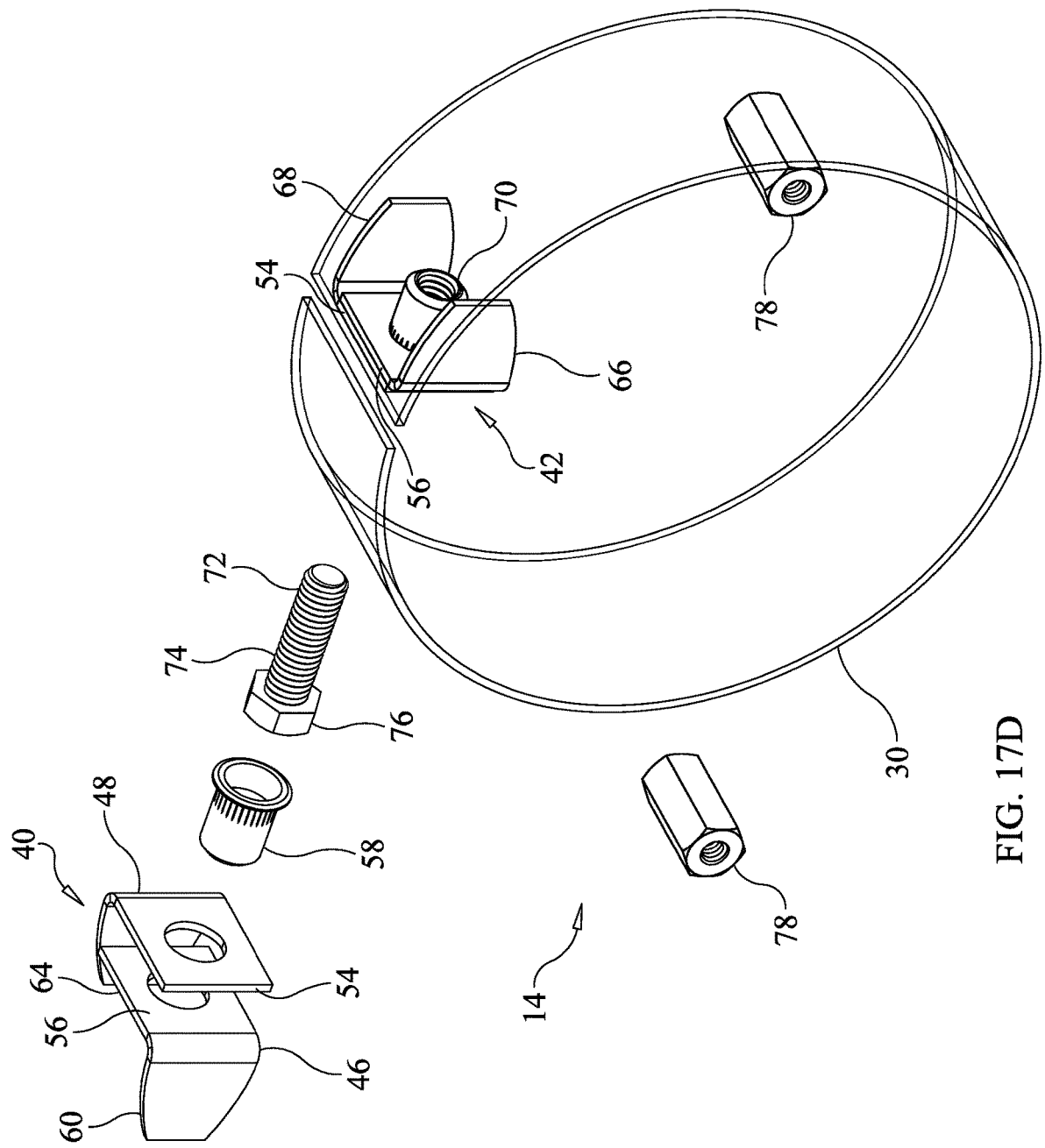
FIG. 17D is an exploded, perspective view of the expandable ring mounting assembly of the connector pipe screen device of the present invention, with the expandable ring being shown in transparent form to facilitate the viewing of other components of the assembly.
Figure 17E:
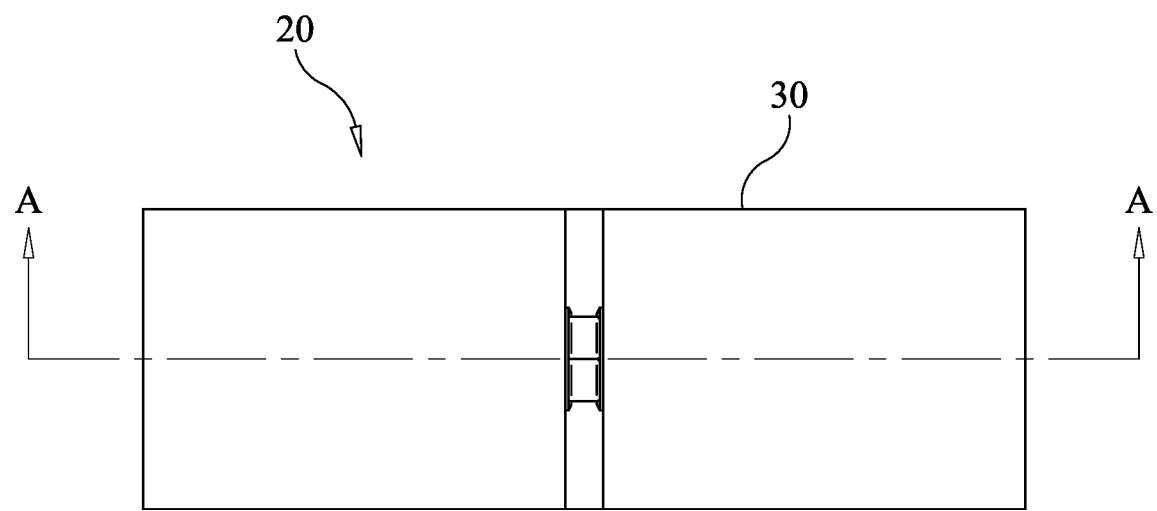
FIG. 17E is a top plan view of the expandable ring mounting assembly of the connector pipe screen device of the present invention.
Figure 17F:
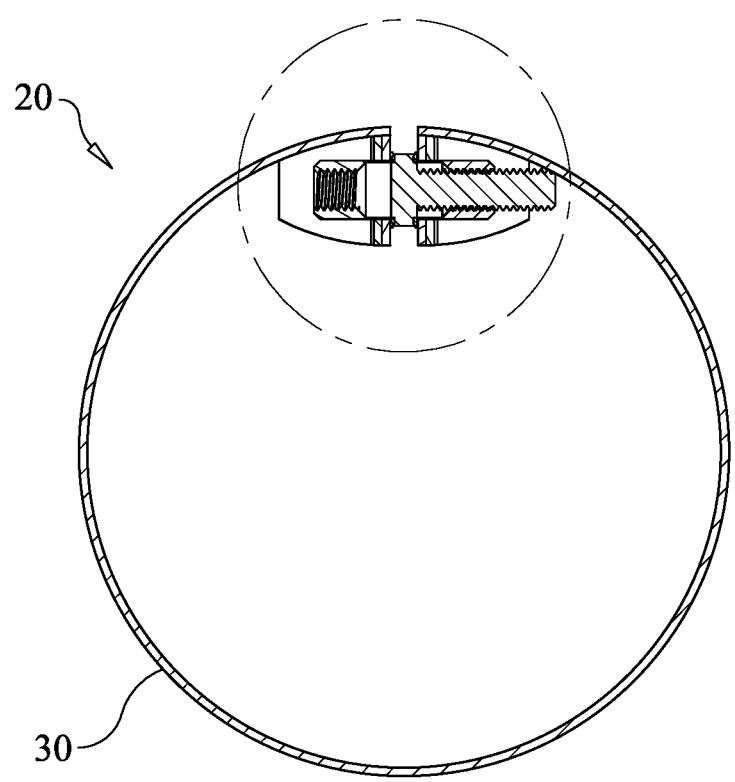
FIG. 17F is a cross-sectional view of the expandable ring mounting assembly of the connector pipe screen device of the present invention shown in FIG. 17E, taken along Line A-A of FIG. 17E.
Figure 17G:
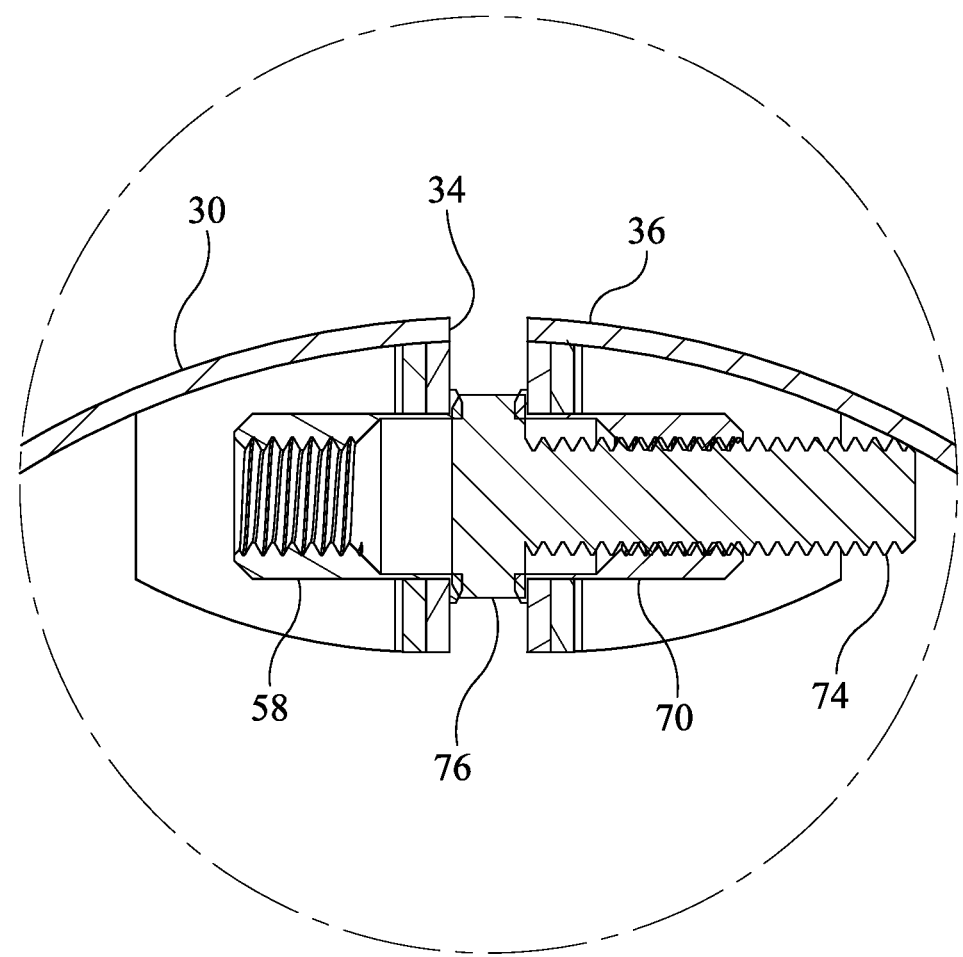
FIG. 17G is an enlarged cross-sectional view of a portion of the expandable ring mounting assembly of the connector pipe screen device of the present invention which is shown in the partially dashed circle of FIG. 17F.

A preferred form of the connector pipe screen device 14 of the present invention is shown in the exploded view of FIG. 8 of the drawings. Basically, the connector pipe screen device 14 includes an expandable ring mounting assembly 20 for mounting the connector pipe screen device 14 to the interior wall 22 or walls of a conduit, such as an outlet pipe 6 extending into a catch basin 2, a back plate 24 that is mounted to the expandable ring mounting assembly 20, and a front cover 26, which is preferably formed at least in part with a perforated sheet of material 28, which front cover 26 is removably mounted on the back plate 24 of the connector pipe screen device 14. Other views of the connector pipe screen device 14 of the present invention are shown in FIGS. 9-13 of the drawings.

Reference should now be had to FIGS. 14-17G of the drawings, which illustrate a preferred form of the expandable ring mounting assembly 20 forming a part of the connector pipe screen device 14 of the present invention. Preferably, the assembly 20 includes a segmented, or split, cylindrical ring 30 preferably formed from stainless steel, having an axial length of about one inch to about six inches in a preferred form. The outer diameter of the ring 30 is chosen such that, when expanded, the outer surface 32 of the ring 30 tightly engages the inner diametrical wall 22 of the outlet pipe 6 in order to secure connector pipe screen device 14 thereto.

The expandable ring 30 is split or cut in an axial direction to define two circumferential open end portions thereof, that is, a first open end portion 34 and a second open end portion 36, that face each other and are separated from each other by a predetermined distance to define a space or gap 38 therebetween. The facing first and second open end portions 34, 36 include cooperating sub-assemblies 40, 42 which effect the separation of the first open end portion 34 and the second open end portion 36 of the expandable ring 30 in order to increase the outer diameter thereof for securing the expandable ring mounting assembly 20 to the inner diametrical wall 22 of the outlet pipe 6, or to decrease the diameter of the expandable ring 30 in order to remove the ring assembly 20 from or initially insert the ring assembly 20 into the bore 44 of the outlet pipe 6 on which the connector pipe screen device 14 of the present invention is mounted or is to be mounted.

Even more specifically, a first sub-assembly 40 of the expandable ring mounting assembly 20 joined to the first open end portion 34 of the expandable ring 30 includes a pair of first and second L-shaped brackets 46, 48, each bracket 46, 48 having a first leg 50 and a second leg 52 joined to the first leg 50 at a right angle thereto. The rear surface 54 of the first leg 50 of the second L-shaped bracket 48 faces and is joined to the front surface 56 of the first leg 50 of the first L-shaped bracket 46 using a first rivet nut 58 or by welding the first legs 50 of the first and second L-shaped brackets 46, 48 together. The first L-shaped bracket 46 is situated and arranged in mirrored symmetry to the second L-shaped bracket 48 so that the second legs 52 of the first L-shaped bracket 46 and the second L-shaped bracket 48 are spaced apart from each other and extend parallelly in the same direction to define the combined brackets 46, 48 with a generally U-shape. Preferably, at least one lateral edge (for example, the top edge 60 shown in FIG. 17B) of each of the second legs 52 of first L-shaped bracket 46 and the second L-shaped bracket 48 is curved, with the curvature of the edge 60 conforming to the curvature of the inside surface 62 of the expandable ring 30 so that the curved lateral edges 60 of the second legs 52 of the first L-shaped bracket 46 and the second L-shaped bracket 48 may closely engage, without gaps, the inside diametrical surface 62 of the expandable ring 30. The first L-shaped bracket 46 and the second L-shaped bracket 48 are joined to the inside surface 62 of the expandable ring 30 preferably by welding the brackets 46, 48 to the ring 30 at the curved lateral edges 60 of the second legs 52 of the first L-shaped bracket 46 and the second L-shaped bracket 48 and also at the top edges 64 of the first legs 50 of one or both brackets 46, 48. Alternatively, the expandable ring mounting assembly 20 and its components, such as including the first L-shaped bracket 46 and the second L-shaped bracket 48, may be integrally formed as one unitary piece and made, for example, from a thermoplastic material.

The second open end portion 36 of the expandable ring 30 of the mounting assembly 20 similarly includes a second sub-assembly 42 for increasing or decreasing, as desired, the outer diameter of the expandable ring 30. The second sub-assembly 42 includes similar structure to that of the first sub-assembly 40, that is, a third L-shaped bracket 66 and a fourth L-shaped bracket 68. The third L-shaped bracket 66 has the same structure as that of the first L-shaped bracket 46, and the fourth L-shaped bracket 68 has the same structure as that of the second L-shaped bracket 48. The third and fourth L-shaped brackets 66, 68 of the second sub-assembly 42 are assembled together in the same manner as the first L-shaped bracket 46 and the second L-shaped bracket 48 of the first sub-assembly 40.

More specifically, the second sub-assembly 42 of the expandable ring mounting assembly 20 is joined to the second open end portion 36 of the expandable ring 30 and includes a pair of third and fourth L-shaped brackets 66, 68, each bracket 66, 68 having a first leg 50 and a second leg 52 joined to the first leg 50 at a right angle thereto. The rear surface 54 of the first leg 50 of the fourth L-shaped bracket 68 faces and is joined to the front surface 56 of the first leg 50 of the third L-shaped bracket 66 using a second rivet nut 70 or by welding the first legs 50 of the third and fourth L-shaped brackets 66, 68 together. The third L-shaped bracket 66 is situated and arranged in mirrored symmetry to the fourth L-shaped bracket 68 so that the second legs 52 of the third L-shaped bracket 66 and the fourth L-shaped bracket 68 are spaced apart from each other and extend parallelly in the same direction to define the combined brackets 66, 68 with a generally U-shape. Preferably, at least one lateral edge (for example, the top edge 60 shown in FIG. 17B) of each of the second legs 52 of third L-shaped bracket 66 and the fourth L-shaped bracket 68 is curved, with the curvature of the edge 60 conforming to the curvature of the inside surface 62 of the expandable ring 30 so that the curved lateral edges 60 of the second legs 52 of the third L-shaped bracket 66 and the fourth L-shaped bracket 68 may closely engage, without gaps, the inside diametrical surface 62 of the expandable ring 30. The third L-shaped bracket 66 and the fourth L-shaped bracket 68 are joined to the inside surface 62 of the expandable ring 30 preferably by welding the brackets 66, 68 to the ring 30 at the curved lateral edges 60 of the second legs 52 of the third L-shaped bracket 66 and the fourth L-shaped bracket 68 and also at the top edges 64 of the first legs 50 of one or both brackets 66, 68. Alternatively, the expandable ring mounting assembly 20 and its components, such as including the first L-shaped bracket 46, the second L-shaped bracket 48, the third L-shaped bracket 66 and the fourth L-shaped bracket 68, may be integrally formed as one unitary piece and made, for example, from a thermoplastic material.

The second rivet nut 70 of the second sub-assembly 42 receives the threaded shank 72 of a machine bolt 74, with the hexagonal head 76 of the machine bolt 74 being situated between the first leg 50 of the second L-shaped bracket 48 of the first sub-assembly 40 and the first leg 50 of the fourth L-shaped bracket 68 of the second sub-assembly 42. The top of the head 76 of the machine bolt 74 rests against the exposed top surface of the first rivet nut 58 of the first sub-assembly 40. In this manner, the first rivet nut 58 acts as a bearing surface for the bolt head 76. Of course, it is envisioned to be within the scope of the present invention to have the threaded shank 72 of the machine bolt 74 received by the first rivet nut 58 rather than the second rivet nut 70, with the exposed top surface of the second rivet nut 70 acting as a bearing surface for the bolt head 76.

In order to change the effective outer diameter of the expandable ring 30 of the assembly 20, an open end wrench is used to engage the bolt head 76 to turn the bolt 74 either clockwise or counterclockwise. In doing so, the threaded machine bolt 74 will either axially advance into either the first or second rivet nut 58, 70 in which it is mounted, or axially retract therefrom, the bolt head 76 engaging the other of the first and second rivet nuts 58, 70, thereby narrowing or widening the gap 38 between the facing first and second open end portions 34, 36 of the expandable ring 30, respectively decreasing or increasing the outer diameter of the expandable ring 30. The expandable ring 30 is preferably resilient, and its resiliency biases the facing first and second open end portions 34, 36 thereof towards one another, thereby closing the gap 38 in the ring 30 when the machine bolt 74 is threaded further into the first rivet nut 58 or the second rivet nut 70 in which it is received.

On diametrically opposite sides of the inner surface 62 of the expandable ring 30 are affixed (by welding or using fasteners) two standoffs 78, each having a threaded axial bore. The standoffs 78 are provided for receiving machine bolts 80 for mounting the back plate 24 of the connector pipe screen device 14 to the expandable ring mounting assembly 20.

The back plate 24 of the connector pipe screen device 14 of the present invention is preferably formed from a planar piece of sheet metal or thermoplastic material bent at its upper and lower ends to define a triangularly shaped upper portion 82 and an opposite triangularly shaped lower portion 84, each being perpendicularly disposed to a planar main body 86 of the back plate 24 and overhanging the front side 88 of the planar main body 86. The planar main body 86 of the back plate 24 includes a main opening 90 formed through the thickness therethrough, which opening 90 will be in alignment with the open area encircled by the expandable ring 30 when mounted thereto and in alignment with the bore 44 of the outlet pipe 6 on which the connector pipe screen device 14 of the present invention is mounted. The diameter of the opening 90 formed in the planar main body 86 of the back plate 24 may be substantially equal to, or less than, the inner diameter of the expandable ring 30 and/or the inner diameter of the outlet pipe 6 on which the connector pipe screen device 14 is mounted.

Machine bolts 80, with washers 92 mounted thereon, may pass through diametrically situated openings (not shown) formed through the thickness of the planar main body portion 86 of the back plate 24 so that the threaded shanks of the machine bolts 80 may be received by the threaded bores of the standoffs 78 in order to mount the back plate 24 to the expandable ring assembly 20. However, even more preferably, the back plate 24 may have arcuately shaped slots 94 formed therein and disposed on opposite sides of the main opening 90 and communicating therewith, each slot 94 having a width which is slightly greater than the shank of one of the machine bolts 80. In this preferred form, the machine bolts 80 may be loosely pre-mounted to the standoffs 78 of the expandable ring mounting assembly 20, and the back plate 24 may be easily mounted to the expandable ring assembly 20 by placing the head of one of the machine bolts 80 through the opening 90 in the planar main body portion 86 of the back plate 24 and maneuvering the shank of the machine bolt 80 into a corresponding arcuate slot 94. Then, the head of the second machine bolt 80 may be passed through the main opening 90 of the back plate 24 and the shank thereof maneuvered into the opposite arcuate slot 80. The back plate 24 is then positioned on the expandable ring mounting assembly 20 such that the opening 90 formed therein is concentric to and aligned with the central area encircled by the ring 30 and the bore 44 of the outlet pipe 6. The two machine bolts 80 are then tightened to secure the back plate 24 in place and in proper position on the expandable ring mounting assembly 20.

In a preferred form of the connector pipe screen device 14 of the present invention, the triangular lower portion 84 of the back plate 24 may include a pair of slots 96 formed through the thickness thereof near opposite triangular free edges 98 of the lower portion 84 of the back plate 24. The triangular upper portion 82 of the back plate 24 may include a pair of threaded openings 100 formed through the thickness thereof preferably near opposite corners 102 of the triangular upper portion 82 near where the upper portion 82 perpendicularly meets the planar main body portion 86. These threaded openings 100 are adapted to receive flared collar thumb screws 104 easily turnable by hand without resort to tools for removably securing the front cover 26 to the back plate 24.

The front cover 26 of the connector pipe screen device 14 of the present invention, in a preferred form, includes a generally V-shaped frame 105 defined by first and second frame segments 106, 108 integrally joined together at about 90 degrees. Each of the first frame segment 106 and second frame segment 108 includes an elongated primary support member 110 (vertically disposed when the connector pipe screen device 14 is properly mounted on the outlet pipe 6) and two parallelly disposed and spaced apart upper and lower secondary support members 112, 114 (horizontally disposed when the connector pipe screen device 14 is properly mounted on the outlet pipe 6) extending outwardly perpendicularly from the primary support member 110. The secondary support members 112, 114 of the first frame segment 106 are joined to corresponding secondary support members 112, 114 of the second frame segment 108. Again, preferably the entire frame 105 may be constructed by bending or shaping lengths of elongated bars of material, be it a thermoplastic material or metal, such as stainless steel, to integrally form the frame 105 of the front cover 26 of the connector pipe screen device 14 as one unitary piece. Alternatively, the first frame segment 106 and the second frame segment 108 may be joined together by welding the corresponding secondary support members 112, 114 of the frame segments 106, 108 together or using fasteners.

The front cover 26 also includes a perforated plate screen 28 bent in a 90 degree "V" formation. Alternatively, each of the first frame segment 106 and the second frame segment 108 may include individual perforated plate screens 28 which are joined together at the apex of the "V" shape defined by the joined frame segments 106, 108. The perforated plate screen 28 extends between the upper and lower secondary support members 112, 114 on each of the first frame segment 112 and the second frame segment 114 of the front cover 26 and is joined to the frame segments 112, 114 by welding or using fasteners, or may be integrally formed with the frame 105 or frame segments 106, 108 of the front cover 26. Preferably, the perforated plate screen 28 does not extend all the way to the top of the primary support members 110 so as to define an opening 116 above the perforated plate screen 28 and the upper secondary support members 112 and under the triangular upper portion 82 of the back plate 24 which overhangs the opening 116 when the front cover 26 is mounted on the back plate 24, the purpose of which is to prevent debris carried by storm water falling from above the connector pipe screen device 14 from entering the opening 116. This opening 116 defines a bypass or spillway formed in the upper portion of the front cover 26 so that, in the event of an unusually high level of storm water filling the catch basin 2, the storm water may flow unimpeded through the bypass opening 116 above the perforated plate screen 28 of the front cover 26 and below the triangular upper portion 82 of the back plate 24 which extends above the front cover 26. However, in most occurrences, the catch basin 2 is designed to handle the volume of storm water flowing into it, the level of which accumulating in the catch basin 2 will not exceed the height of the perforated plate screen 28 of the front cover 26, and any debris carried thereby will be prevented from flowing through the perforated plate screen 28 and into the outlet pipe 6.

Preferably, the lower secondary support members 114 of the first and second frame segments 106, 108 of the front cover 26 include tabs 118 that extend downwardly and outwardly therefrom, which tabs 118 are dimensioned to be received by the corresponding slots 96 formed in the triangular lower portion 84 of the back plate 24. Additionally, the upper ends 120 of the primary support members 110 of the first and second frame segments 106, 108 of the front cover 26 situated above the upper secondary support members 112 include perpendicularly extending flanges 122, each flange 122 having an opening 124 formed through its thickness. The front cover 26 may be removably mounted to the back plate 24 of the connector pipe screen device 14 of the present invention by positioning the tabs 118 on the front cover 26 in alignment with the slots 96 in the triangular lower portion 84 of the back plate 24 so that the tabs 118 are received thereby, and positioning the bent upper flanges 122 of the front cover 26 on the upper surface of the triangular upper portion 82 of the back plate 24, with the openings 124 formed in the flanges 122 in alignment with the threaded openings 100 formed in the triangular upper portion 82 of the back plate 24. Thumb screws 104 are then used to secure the front cover 26 to the back plate 24 by inserting the screws 104 through the openings 124 in the flanges 122 of the front cover 26 and the threaded openings 100 in the triangular upper portion 82 of the back plate 24. The front cover 26 may be easily removed from the back plate 24 by a municipal worker by turning the thumb screws 104 by hand so that any debris or sediment collecting between the front cover 26 and the back plate 24 may be removed.

Figure 18:
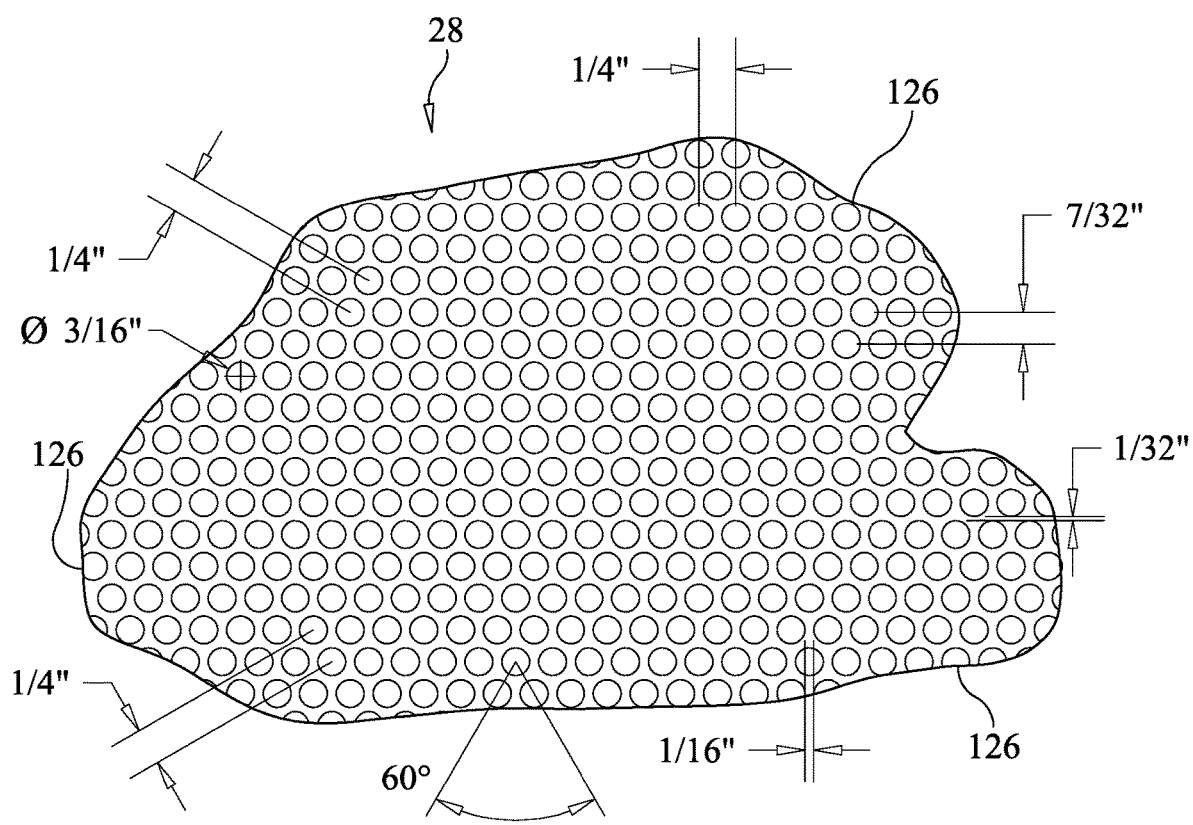
FIG. 18 is a front view of a portion of a perforated screen forming part of the front cover of the connector pipe screen device of the present invention, and illustrating the preferred dimensions and placement of the openings or apertures formed in the perforated screen.

FIG. 18 illustrates the preferred dimensions and spacing of the openings 126 formed in the perforated material 28 defining the screen of the front cover 26. In its preferred form, the perforated material 28 includes a multiplicity of openings 126 having the following dimensions: the spacing between the centers of adjacent openings 126 residing in the same row of openings 126 is preferably about one-quarter ($\frac{1}{4}$) of an inch; the inner diameter of each opening 126 is preferably about three-sixteenth ($\frac{3}{16}$) inches; the spacing between the outer diameters of adjacent openings 126 of the same horizontal or non-horizontal row of openings 126, that is, defining non-permeable material therebetween, is preferably about one-sixteenth ($\frac{1}{16}$) inches; the spacing between respective planes in which reside facing portions of the outer diameters of openings 126 in adjacent parallel rows of openings 126 is preferably about one-thirty-second ($\frac{1}{32}$) inches; the spacing between respective planes in which reside the centers of openings 126 in one row of openings 126 and the centers of openings 126 in an adjacent parallel row of openings 126 is preferably about seven-thirty-second ($\frac{7}{32}$) inches; and the offset angle between the center of an opening 126 residing in one row of openings 126 and the centers of two adjacent openings 126 in an adjacent parallel row of openings 126 is preferably about sixty (60) degrees, meaning that a first opening 126 residing in a first row of openings 126 is spatially offset on the perforated screen material 28 from a second opening 126 adjacent to the first opening 126 but residing in an adjacent parallel row of openings 126 preferably by about thirty (30) degrees.

For a connector pipe screen device 14 of the present invention designed with an expandable ring assembly 20 for mounting on an outlet pipe 6 having an inner diameter of about six inches, the weight of the connector pipe screen device 14 is about 15 pounds. The front cover 26, including the frame 105 and perforated screen 28, the back plate 24 and the expandable ring mounting assembly 20 are preferably made from 304 stainless steel material, and the thumb screws 104 and machine bolts 74, 80 and other hardware are preferably formed from 18-8 stainless steel.

As far as performance characteristics are concerned, and for a connector pipe screen device 14 designed for use with a six inch inner diameter outlet pipe 6 and having a perforated plate screen 28 with the preferred dimensions described above and shown in FIG. 18, the filtered flow rate through the perforated screen material 28 is about 400 gallons per minute (0.89 CFS), and the bypass flow rate through the bypass opening 116 formed in the front cover 26 is about 388 gallons per minute (0.87 CFS).

Figure 19:
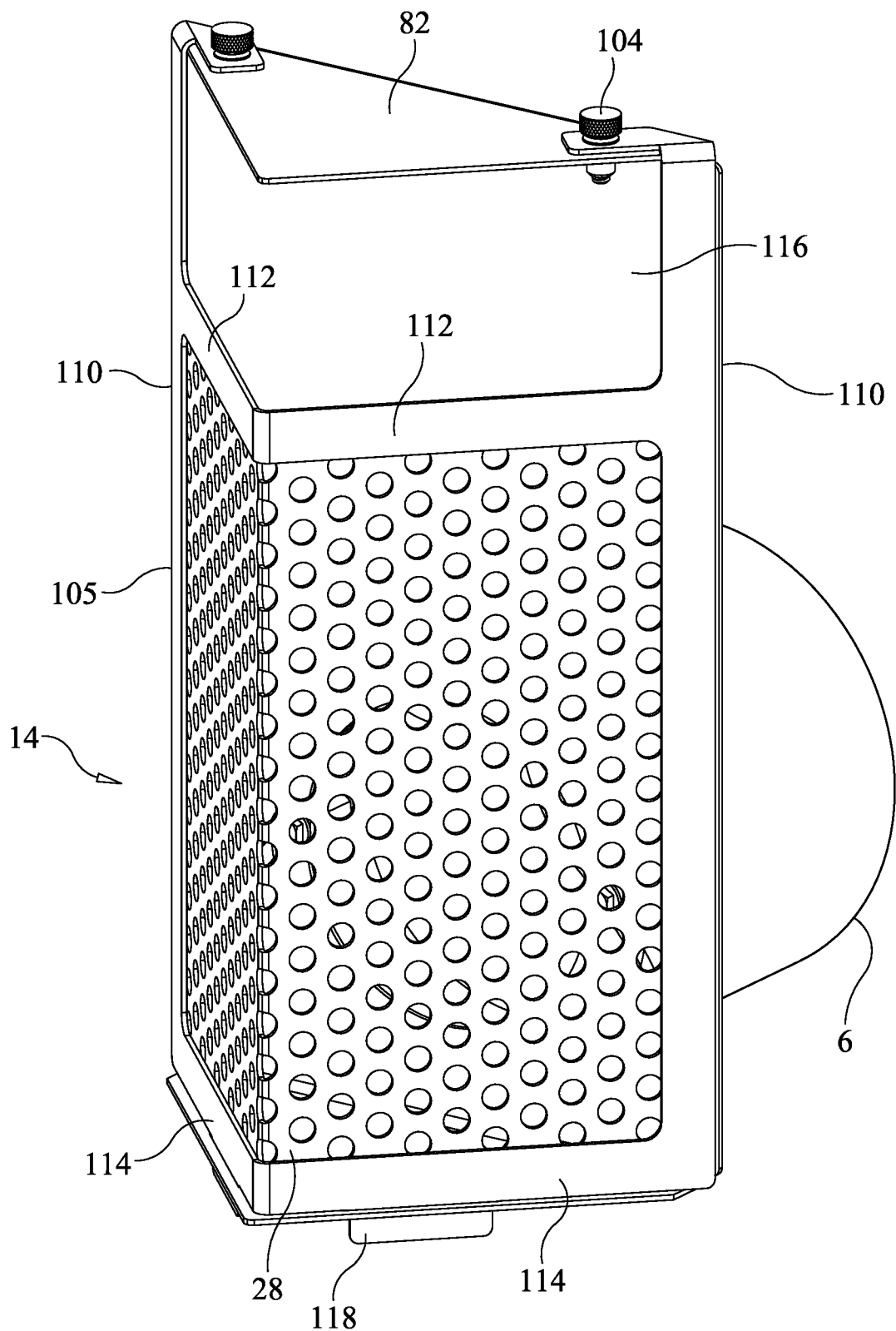
FIG. 19 is a front perspective view of the connector pipe screen device of the present invention shown mounted on an outlet pipe.

FIG. 19 illustrates the connector pipe screen device 14 of the present invention mounted on an outlet pipe 6 or infiltration conduit to prevent debris carried by storm water from flowing therethrough and into the outlet pipe 6.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A connector pipe screen device configured for mounting on a water conduit, the water conduit having a side wall and an axial end, the side wall defining a conduit opening disposed at the axial end of the conduit, the connector pipe screen device being mountable on the conduit near or at the axial end of the conduit at which the conduit opening is disposed, the connector pipe screen device comprising:
   an expandable ring mounting assembly, the expandable ring mounting assembly being configured to be engagable with and securable to the conduit near or at the axial end of the conduit at which the conduit opening is disposed;
   a back plate mounted on the expandable ring mounting assembly; and
   a front cover mounted on the back plate, the front cover having a perforated portion defining a multiplicity of openings formed therein to allow water to pass through the perforated portion and to prevent debris carried by the water from passing through the perforated portion.

2. A connector pipe screen device as defined by claim 1, wherein the connector pipe screen device is configured to be removably mountable on the conduit.

3. A connector pipe screen device as defined by claim 1, wherein the side wall of the conduit has an interior surface; and
   wherein the expandable ring mounting assembly of the connector pipe screen device is engagable with the interior surface of the side wall of the conduit to secure the connector pipe screen device to the conduit.

4. A connector pipe screen device as defined by claim 3, wherein the expandable ring mounting assembly of the connector pipe screen device is removably engagable with the interior surface of the side wall of the conduit to removably attach the connector pipe screen device to the conduit.

5. A connector pipe screen device as defined by claim 3, wherein the expandable ring mounting assembly includes an expandable ring, the expandable ring having an adjustable outer diameter, the expandable ring being configurable in at least a first state and a second state, the outer diameter of the expandable ring being greater when the expandable ring is in the second state than the outer diameter of the expandable ring when the expandable ring is in the first state; and
   wherein the expandable ring includes an outer surface and an inner surface situated opposite the outer surface, the outer surface of the expandable ring being engagable with the interior surface of the side wall of the conduit to secure the connector pipe screen device to the conduit.

6. A connector pipe screen device as defined by claim 5, wherein the expandable ring is split in an axial direction to define a first open end portion and a second open end portion, the first open end portion and the second open end portion facing each other and being mutually separated to define a space therebetween.

7. A connector pipe screen device as defined by claim 6, wherein the expandable ring mounting assembly includes:
   a first sub-assembly disposed at and joined to the first open end portion of the expandable ring and a second sub-assembly disposed at and joined to the second open end portion of the expandable ring; and
   a machine bolt, the machine bolt extending at least partially between and engaging the first sub-assembly and the second sub-assembly and being rotatably mounted on at least one of the first sub-assembly and the second sub-assembly, the machine bolt being rotatable in a first direction and a second direction, the first direction being opposite to the second direction;
   wherein rotation of the machine bolt in the second direction causes the expandable ring to change from the first state to the second state, thereby increasing the outer diameter of the expandable ring; and
   wherein rotation of the machine bolt in the first direction causes the expandable ring to change from the second state to the first state, thereby decreasing the outer diameter of the expandable ring.

8. A connector pipe screen device as defined by claim 7, wherein the first sub-assembly of the expandable ring mounting assembly includes a pair of first and second L-shaped brackets, each of the first and second L-shaped brackets having a first leg and a second leg joined to the first leg at a right angle thereto, each of the first leg and the second leg of each of the first and second L-shaped brackets including a front surface and a rear surface situated opposite the front surface, the rear surface of the first leg of the second L-shaped bracket facing and being in close proximity to the front surface of the first leg of the first L-shaped bracket, the first L-shaped bracket being situated and arranged in mirrored symmetry to the second L-shaped bracket such that the second legs of the first L-shaped bracket and the second L-shaped bracket are spaced apart from each other and extend parallelly in the same direction to define together the arranged first and second L-shaped brackets with a generally U-shape; and
   wherein the second sub-assembly of the expandable ring mounting assembly includes a pair of third and fourth L-shaped brackets, each of the third and fourth L-shaped brackets having a first leg and a second leg joined to the first leg at a right angle thereto, each of the first leg and the second leg of each of the third and fourth L-shaped brackets including a front surface and a rear surface situated opposite the front surface, the rear surface of the first leg of the fourth L-shaped bracket facing and being in close proximity to the front surface of the first leg of the third L-shaped bracket, the third L-shaped bracket being situated and arranged in mirrored symmetry to the fourth L-shaped bracket such that the second legs of the third L-shaped bracket and the fourth L-shaped bracket are spaced apart from each other and extend parallelly in the same direction to define together the arranged third and fourth L-shaped brackets with a generally U-shape.

9. A connector pipe screen device as defined by claim 8, wherein the expandable ring, the first L-shaped bracket, the second L-shaped bracket, the third L-shaped bracket and the fourth L-shaped bracket of the expandable ring mounting assembly are integrally formed as one unitary piece.

10. A connector pipe screen device as defined by claim 8, wherein the expandable ring, the first L-shaped bracket, the second L-shaped bracket, the third L-shaped bracket and the fourth L-shaped bracket of the expandable ring mounting assembly are integrally formed as one unitary piece from a thermoplastic material.

11. A connector pipe screen device as defined by claim 8, wherein the first sub-assembly of the expandable ring mounting assembly includes a first rivet nut, the first rivet nut joining the first legs of the first and second L-shaped brackets together;
   wherein the second sub-assembly of the expandable ring mounting assembly includes a second rivet nut, the second rivet nut joining the first legs of the third and fourth L-shaped brackets together; and wherein the machine bolt passes through at least one of the first rivet nut and the second rivet nut.

12. A connector pipe screen device as defined by claim 11, wherein the first L-shaped bracket and the second L-shaped bracket are joined to the inner surface of the expandable ring; and
wherein the third L-shaped bracket and the fourth L-shaped bracket are joined to the inner surface of the expandable ring.

13. A connector pipe screen device as defined by claim 11, wherein the machine bolt of the expandable ring mounting assembly has a head and a threaded shank extending from the head;
wherein the second rivet nut of the second sub-assembly receives the threaded shank of the machine bolt, with the head of the machine bolt being situated between the first leg of the second L-shaped bracket of the first sub-assembly and the first leg of the fourth L-shaped bracket of the second sub-assembly; and
wherein the top portion of the head of the machine bolt rests against an exposed top surface of the first rivet nut of the first sub-assembly, whereby the first rivet nut acts as a bearing surface for the bolt head;
whereby, in order to change the effective outer diameter of the expandable ring of the expandable ring mounting assembly, the bolt head is rotated in one of the first direction and the second direction such that the machine bolt will either axially advance into the second rivet nut in which it is mounted, or axially retract therefrom, the bolt head engaging the first rivet nut, thereby narrowing or widening the space between the facing first and second open end portions of the expandable ring, respectively decreasing or increasing the outer diameter of the expandable ring.

14. A connector pipe screen device as defined by claim 13, wherein the expandable ring is resilient, the resiliency thereof biasing the facing first and second open end portions thereof towards one another, thereby closing the space in the expandable ring when the machine bolt is threaded further into the second rivet nut in which it is received.

15. A connector pipe screen device as defined by claim 11, wherein the machine bolt has a head and a threaded shank extending from the head;
wherein the first rivet nut of the first sub-assembly receives the threaded shank of the machine bolt, with the head of the machine bolt being situated between the first leg of the fourth L-shaped bracket of the second sub-assembly and the first leg of the second L-shaped bracket of the first sub-assembly; and
wherein the top portion of the head of the machine bolt rests against an exposed top surface of the second rivet nut of the second sub-assembly, whereby the second rivet nut acts as a bearing surface for the bolt head;
whereby, in order to change the effective outer diameter of the expandable ring of the expandable ring mounting assembly, the bolt head is rotated in one of the first direction and the second direction such that the machine bolt will either axially advance into the first rivet nut in which it is mounted, or axially retract therefrom, the bolt head engaging the second rivet nut, thereby narrowing or widening the space between the facing first and second open end portions of the expandable ring, respectively decreasing or increasing the outer diameter of the expandable ring.

16. A connector pipe screen device as defined by claim 15, wherein the expandable ring is resilient, the resiliency thereof biasing the facing first and second open end portions thereof towards one another, thereby closing the space in the expandable ring when the machine bolt is threaded further into the first rivet nut in which it is received.

17. A connector pipe screen device as defined by claim 1, wherein the back plate include a planar main body, the planar main body having a main opening formed through the thickness thereof;
wherein the expandable ring of the expandable ring mounting assembly defines a central opening at least partially encircled by the expandable ring; and
wherein the back plate is mounted on the expandable ring mounting assembly such that the main opening formed in the planar main body is disposed in alignment with the central opening of the expandable ring.

18. A connector pipe screen device as defined by claim 17, wherein the back plate is removably mounted on the expandable ring mounting assembly.

19. A connector pipe screen device as defined by claim 17, wherein the planar main body of the back plate further includes a pair of arcuate slots formed through the thickness thereof, the arcuate slots extending outwardly from opposite sides of the main opening formed in the planar main body, the arcuate slots being provided to receive machine screws for adjustably mounting the back plate on the expandable ring mounting assembly.

20. A connector pipe screen device as defined by claim 17, wherein the planar main body of the back plate includes a front side and a rear side situated opposite the front side; and
wherein the back plate further includes a triangularly shaped upper portion joined to the planar main body and a triangularly shaped lower portion joined to the planar main body, the triangularly shaped upper and lower portions extending perpendicularly from the planar main body on the front side thereof.

21. A connector pipe screen device as defined by claim 20, wherein the back plate is formed from a planar piece of material having upper and lower ends, the planar piece of material being bent at the upper and lower ends thereof to integrally form therefrom the triangularly shaped upper portion, the triangularly shaped lower portion and the planar main body of the back plate.

22. A connector pipe screen device as defined by claim 20, wherein the triangularly shaped upper portion of the back plate and the perforated portion of the front cover define an opening therebetween which acts as a spillway.

23. A connector pipe screen device as defined by claim 1, wherein the front cover is removably mounted on the back plate.

24. A connector pipe screen device as defined by claim 1, wherein the front cover is formed with a "V" shape in transverse cross-section.

25. A connector pipe screen device as defined by claim 24, wherein the perforated portion of the front cover is formed with a "V" shape in transverse cross-section.

26. A connector pipe screen device as defined by claim 1, wherein the openings formed in the perforated portion are arranged in a plurality of parallelly disposed rows of spaced apart openings.

27. A connector pipe screen device as defined by claim 26, wherein the spacing between the centers of adjacent openings of the perforated portion residing in the same row of openings is about one-quarter ($\frac{1}{4}$) of an inch;
wherein the inner diameter of each opening is about three-sixteenth ($\frac{3}{16}$) inches;
wherein the spacing between the outer diameters of adjacent openings of the perforated portion residing in the same row of openings is about one-sixteenth ($\frac{1}{16}$)

inches, and defines water impermeable material of the perforated portion between the adjacent openings residing in the same row of openings;

wherein the spacing between respective planes in which reside facing portions of the outer diameters of openings in adjacent parallel rows of openings is about one-thirty-second ($1/32$) inches;

wherein the spacing between respective planes in which reside the centers of openings in one row of openings and the centers of openings in an adjacent parallel row of openings is about seven-thirty-second ($7/32$) inches; and wherein a respective opening residing in one row of openings is offset from openings adjacent to the respective opening and residing in an adjacent parallel row of openings by about thirty (30) degrees.

* * * * *